US010631312B2

(12) United States Patent
Hong et al.

(10) Patent No.: US 10,631,312 B2
(45) Date of Patent: Apr. 21, 2020

(54) APPARATUS AND METHOD FOR TRANSMITTING AND RECEIVING DATA IN WIRELESS COMMUNICATION SYSTEM

(71) Applicant: Samsung Electronics Co., Ltd., Suwon-si, Gyeonggi-do (KR)

(72) Inventors: Sungnam Hong, Suwon-si (KR); Yeohun Yun, Hwaseong-si (KR); Chanhong Kim, Suwon-si (KR); Taeyoung Kim, Seoul (KR); Jiyun Seol, Seongnam-si (KR); Jongbu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/928,676

(22) Filed: Mar. 22, 2018

(65) Prior Publication Data

US 2018/0279330 A1  Sep. 27, 2018

(30) Foreign Application Priority Data

Mar. 23, 2017 (KR) .................. 10-2017-0037143

(51) Int. Cl.
 *H04W 72/12* (2009.01)
 *H04W 72/04* (2009.01)
 (Continued)

(52) U.S. Cl.
 CPC ....... *H04W 72/121* (2013.01); *H04J 11/0023* (2013.01); *H04L 1/0013* (2013.01);
 (Continued)

(58) Field of Classification Search
 CPC   H04W 72/082; H04W 72/121; H04L 5/0073; H04L 1/0013
 See application file for complete search history.

(56) References Cited

U.S. PATENT DOCUMENTS

| 9,031,009 B2 | 5/2015 | Fujii et al. | |
| 2014/0044095 A1* | 2/2014 | Li | H04W 16/14 370/331 |

(Continued)

FOREIGN PATENT DOCUMENTS

| EP | 3 091 774 A2 | 11/2016 |
| KR | 10-2017-0008758 A | 1/2007 |
| KR | 10-2016-0107978 A | 9/2016 |

OTHER PUBLICATIONS

Samsung, 'Multiplexing of eMBB and URLLC in Downlink', R1-1702994, 3GPP TSG RAN WG1 Meeting #88, Feb. 7, 2017, Athens, Greece, http://www.3gpp.org/ftp/tsg_ran/WG1_RL1/TSGR1_88/Docs/, See sections 2.1-2.3.

(Continued)

*Primary Examiner* — Shukri Taha
(74) *Attorney, Agent, or Firm* — Jefferson IP Law, LLP

(57) ABSTRACT

A communication scheme and system for converging a 5$^{th}$ generation (5G) communication system for supporting a data rate higher than that of a 4$^{th}$ generation (4G) system with an internet of things (IoT) technology are provided. The communication scheme is applicable to intelligent services (e.g., smart homes, smart buildings, smart cities, smart cars, connected cars, health care, digital education, retail, and security and safety-related services) based on the 5G communication technology and the IoT-related technology.

20 Claims, 11 Drawing Sheets

(51) Int. Cl.
  *H04L 1/00* (2006.01)
  *H04L 5/00* (2006.01)
  *H04J 11/00* (2006.01)
  *H04L 1/18* (2006.01)
  *H04W 4/70* (2018.01)

(52) U.S. Cl.
  CPC .......... *H04L 1/1896* (2013.01); *H04L 5/0073* (2013.01); *H04W 72/048* (2013.01); *H04W 72/1226* (2013.01); *H04W 72/1284* (2013.01); *H04W 72/1289* (2013.01); *H04J 11/005* (2013.01); *H04W 4/70* (2018.02); *H04W 72/044* (2013.01)

(56) References Cited

U.S. PATENT DOCUMENTS

| | | | | |
|---|---|---|---|---|
| 2014/0355471 | A1* | 12/2014 | Lee | H04W 24/10 370/252 |
| 2015/0071191 | A1* | 3/2015 | Kim | H04L 5/0057 370/329 |
| 2015/0208428 | A1* | 7/2015 | Park | H04L 5/0035 370/329 |
| 2015/0256308 | A1 | 9/2015 | Ma et al. | |
| 2015/0280871 | A1 | 10/2015 | Xu et al. | |
| 2015/0333898 | A1 | 11/2015 | Ji et al. | |
| 2016/0249245 | A1* | 8/2016 | Kim | H04B 17/345 |
| 2016/0262152 | A1 | 9/2016 | Yoo et al. | |
| 2016/0323893 | A1 | 11/2016 | Feng et al. | |
| 2017/0006613 | A1* | 1/2017 | Kakishima | H04B 7/0413 |
| 2017/0339579 | A1* | 11/2017 | Chu | H04W 24/02 |
| 2018/0131485 | A1* | 5/2018 | Wang | H04W 52/365 |
| 2019/0208505 | A1* | 7/2019 | Park | H04W 72/042 |

OTHER PUBLICATIONS

Samsung et al., 'WF on Multiplexing of eMBB and URLLC in DL', R1-1704055, 3GPP TSG RAN WG1 Meeting #88, Feb. 7, 2017, Athens, Greece, http://www.3gpp.org/ftp/tsg_ran/WG1_RL1/TSGR1_88/Docs/, See pp. 2-5.

* cited by examiner

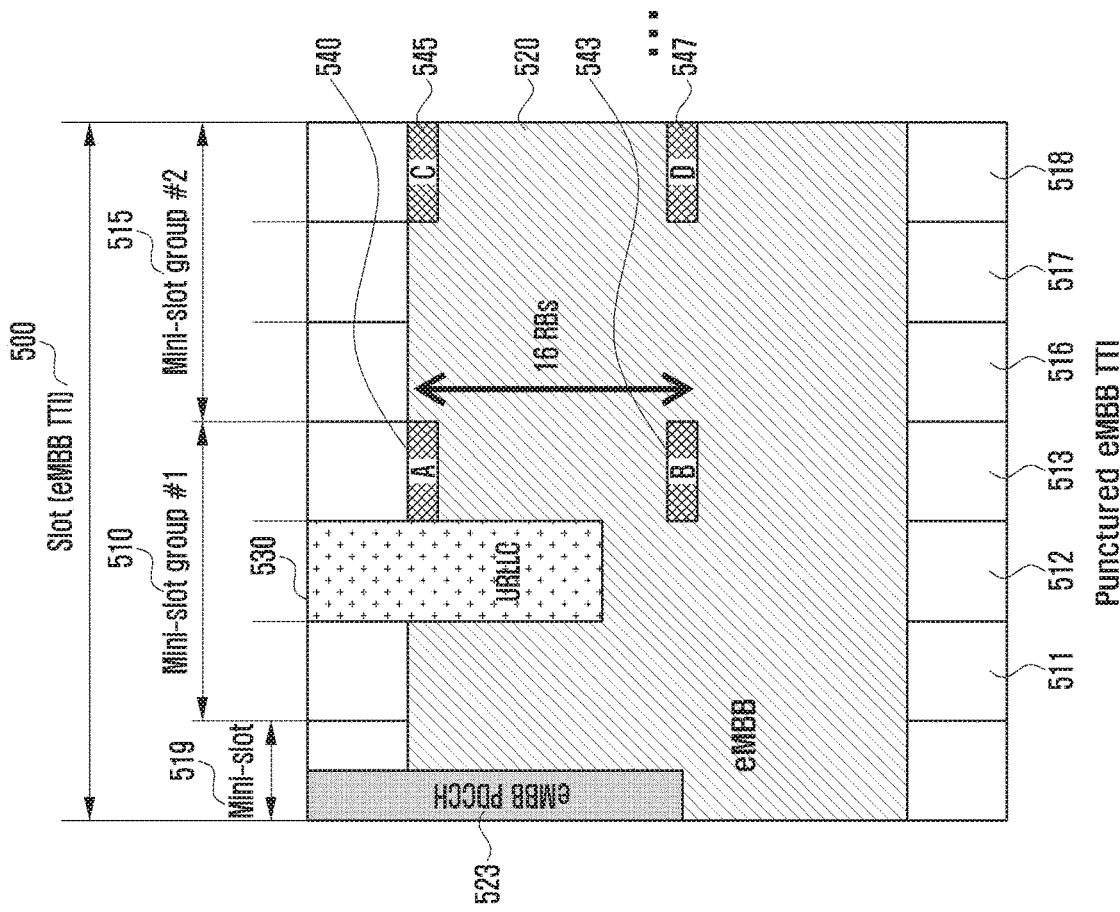
FIG. 6

APPARATUS AND METHOD FOR TRANSMITTING AND RECEIVING DATA IN WIRELESS COMMUNICATION SYSTEM

CROSS-REFERENCE TO RELATED APPLICATION(S)

This application is based on and claims priority under 35 U.S.C. § 119 of a Korean patent application number 10-2017-0037143, filed on Mar. 23, 2017, in the Korean Intellectual Property Office, the disclosure of which is incorporated by reference herein in its entirety.

TECHNICAL FIELD

The disclosure relates to an apparatus and method for transmitting and receiving data in a wireless communication system. More particularly, the disclosure relates to an apparatus and method for transmitting and receiving heterogeneous service data in the wireless communication system.

BACKGROUND

In order to meet the increasing demand for wireless data traffic since the commercialization of 4th generation (4G) communication systems, the development focus is on the 5$^{th}$ generation (5G) or pre-5G communication system. For this reason, the 5G or pre-5G communication system is called a beyond 4G network communication system or post long-term evolution (LTE) system.

Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

In order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) (FQAM) and sliding window superposition coding (SWSC) as advanced coding modulation (ACM), filter bank multi-carrier (FBMC), non-orthogonal multiple access (NOMA), and sparse code multiple access (SCMA).

The Internet is evolving from a human-centric communication network in which information is generated and consumed by humans to the internet of things (IoT) in which distributed things or components exchange and process information. The combination of the cloud server-based Big data processing technology and the IoT begets internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

On the basis of diverse technological developments, it is expected that a 5G system will support more diverse services than legacy 4G systems. For example, the most representative services include an enhanced mobile broad band (eMBB) service, an ultra-reliable and low latency communication (URLLC) service, a massive machine type communication (mMTC) service, and an evolved multimedia broadcast/multicast service (eMBMS). The system that provides the URLLC service may be referred to as an URLLC system, and the system that provides the eMBB service may be referred to as an eMBB system. The terms "service" and "system" can be used interchangeably.

Among the aforementioned services, the URLLC service, which is newly introduced in the 5G system, unlike the legacy 4G system, has to satisfy the requirements of ultra-reliability (e.g., packet error rate of about $10^{-5}$) and low latency (e.g., about 0.5 msec) that are more demanding in comparison with other services. In order to meet the challenging requirements, the URLLC service needs to use a transmission time interval (TTI) shorter than that for the eMBB service, and various operation methods are being considered for providing the URLLC service.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for mitigating performance degradation of a low priority service in the case of allocating part of resources reserved for the low priority service for the purpose of supporting a high priority service in a situation where heterogeneous services are provided in the wireless communication system.

Another aspect of the disclosure is to provide an efficient low priority service resource allocation information provision method of a transmitter or a base station in consideration of the capability of a receiver or a terminal.

The objects of the disclosure are not limited to the aforesaid, and other objects not described herein will be clearly understood by those skilled in the art from the descriptions below.

In accordance with an aspect of the disclosure, a communication method of a terminal is provided. The communication method includes transmitting, to a base station, a first message including information on a timing for the terminal to receive interference impact information including information on an interference caused by a second signal of a second system using a second transmission time interval (TTI) to a first signal of a first system using a first TTI and receiving, from the base station, a second message including information on a timing for the base station to transmit the interference impact information, the timing being determined based on the information on the timing for the terminal to receive the interference impact information. Preferably, the first message further includes information indicating whether the terminal has a capability of blindly detecting information on a portion of the first signal of the first system, the portion being impacted by interference caused by the second signal of the second system. Preferably, the timing for the terminal to receive the interference impact information comprises at least one of a first timing when the first signal of the first system, the first signal being impacted by the interference caused by the second signal of the second signal, is transmitted and a second timing when a retransmission signal of the first signal of the first system, the first signal being impacted by the interference caused by the second signal of the second system, is transmitted. Preferably, the first system is an enhanced mobile broadband (eMBB) system, and the second system is an ultra-reliable and low latency communication (URLLC) system.

In accordance with another aspect of the disclosure, a communication method of a base station is provided. The communication method includes receiving, from a terminal, a first message including information on a timing for the terminal to receive interference impact information including information on an interference caused by a second signal of a second system using a second TTI to a first signal of a first system using a first TTI, determining a timing for the base station to transmit the interference impact information based on the information on the timing when the terminal is capable of receiving the interference impact information, and transmitting, to the terminal, a second message including the information on the timing for the base station to transmit the interference impact information. Preferably, the timing for the base station to transmit the interference impact information includes at least one of a first timing when the first signal of the first system, the first signal being impacted by the interference caused by the second signal of the second signal, is transmitted and a second timing when a retransmission signal of the first signal of the first system, the first signal being impacted by the interference caused by the second signal of the second system, is transmitted.

In accordance with another aspect of the disclosure, a terminal is provided. The terminal includes a transceiver configured to transmit and receive signals, and a controller configured to control to transmit, to a base station, a first message including information on a timing for the terminal to receive interference impact information including information on an interference caused by a second signal of a second system using a second TTI to a first signal of a first system using a first TTI and receive, from the base station, a second message including information on a timing for the base station to transmit the interference impact information, the timing being determined based on the information on the timing for the terminal to receive the interference impact information.

In accordance with another aspect of the disclosure, a base station is provided. The base station includes a transceiver configured to transmit and receive signals, and a controller configured to control to receive, from a terminal, a first message including information on a timing for the terminal to receive interference impact information including an interference caused by a second signal of a second system using a second TTI to a first signal of a first system using a first TTI, determine a timing for the base station to transmit the interference impact information based on the information on the timing when the terminal is capable of receiving the interference impact information, and transmit to the terminal a second message including the information on the timing for the base station to transmit the interference impact information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating a method for transmitting second interference impact information for the case where the eMBB and URLLC services coexist according to an embodiment of the disclosure;

Throughout the drawings, like reference numerals will be understood to refer to like parts, components, and structures.

DETAILED DESCRIPTION

Figure 1:
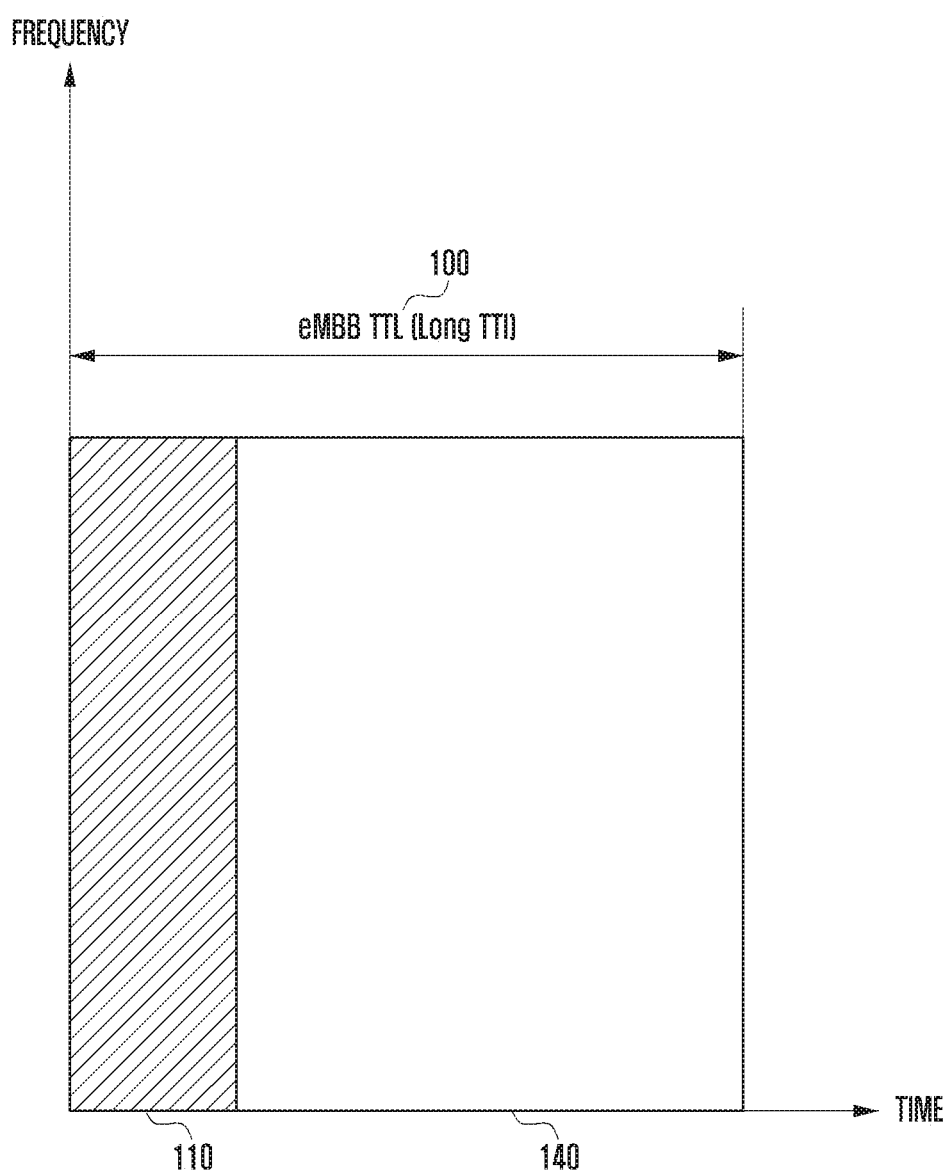
FIG. 1 is a diagram exemplifying resources for providing an enhanced mobile broad band (eMBB) service according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

When it is described that a part is "connected to" or "coupled to" another part, this may mean to include not only a case of "being directly connected to" but also a case of "being indirectly connected to" by interposing another device therebetween. It will be understood that the terms "comprises," "comprising," "includes," and/or "including" used herein specify including the following elements but not excluding others.

Although the components are depicted separately to indicate distinctive features, this does not mean that the components are configured as individual hardware or software units. The components are enumerated separately just for convenience of explanation, but at least two of the components can be implemented as a single component or one component can be divided into a plurality of components taking charge of corresponding functions. The embodiments of the integrated and divided components are included in the scope of the disclosure without departing from the spirit of the disclosure.

Although the components are depicted separately to indicate distinctive features, this does not mean that the components are configured as individual hardware or software units. The components are enumerated separately just for convenience of explanation, and at least two of the components can be implemented as a single component or one component can be divided into a plurality of components taking charge of corresponding functions. The embodiments of the integrated and divided components are included in the scope of the disclosure without departing from the spirit of the disclosure.

Some of the components may not be essential components for inevitable functions of the disclosure and may be optional components just for performance enhancement. The disclosure can be implemented with only the essential components required for implementing the subject matter of the disclosure with the exception of the optional components for performance enhancement, and such a configuration with only the essential components with the exception of the optional components can be included in the claims of the disclosure.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

According to various embodiments of the disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Before undertaking the detailed description of the disclosure below, it may be advantageous to make a brief description of a 5G or new radio (NR) wireless communication system. The 5G wireless communication system operates over broad frequency ranges in comparison with the legacy $3^{rd}$ generation (3G) and $4^{th}$ generation (4G or LTE/LTE-A) wireless communication systems. Unlike the legacy 3G and 4G wireless communication standards developed in consideration of backward compatibility, the 5G wireless communication standards consider forward compatibility. In accordance with the standardization policy, the 5G wireless communication system specifies use cases of three service categories. The three service categories of the 5G wireless communication system are as follows:

The first service category is enhanced mobile broadband (eMBB) service, the second service category is massive machine type communication (mMTC) service as a data communication service among things through wireless connections without any direct manipulation or involvement of a human being for information acquisition and transmission anytime anywhere, and the ultra-reliable low latency communication (URLLC) service.

In the following description, the enhanced data rate-based data communication service as the first service category may be interchangeably referred to as "data communication," "data communication service," "eMBB," "eMBB service," and "eMBB communication service" with the same meaning for convenience of explanation.

The massive IoT-based communication service as the second service category may be interchangeably referred to as "IoT," "IoT service," "eMTC communication," "eMTC communication service," and "eMTC service" with the same meaning for convenience of explanation.

The IoT communication service based on the ultra-low latency and ultra-reliability as the third service category may be interchangeably referred to as "ultra-low latency service," "highly reliable service," "ultra-low latency communication," "highly reliable communication," "ultra-low latency highly reliable IoT communication," "ultra-low latency highly reliable IoT communication service," "URLLC," "URLLC communication," "URLLC service," and "URLLC communication service" with the same meaning for convenience of explanation.

The URLLC needs to meet the requirements of ultra-reliability (e.g., packet error rate $10^{-5}$) and low latency (e.g., about 0.5 msec) in comparison with other services. In order to meet the challenging requirements, the URLLC service needs to use a transmission time interval (TTI) shorter than that for the eMBB service, and various operation methods are being considered for providing the URLLC service.

For example, it may be possible to consider a scenario in which the eMBB service is scheduled based on the eMBB TTI and the URLLC service based on a TTI shorter than the eMBB TTI. In this case, it may occur that the base station (gNB, eNB, etc.) has to transmit a URLLC packet in the middle of transmitting the eMBB service packets. In such a case, in order to transmit the URLLC packet in the middle of transmitting eMBB service packets, it may be necessary to allocate part of the resources reserved for the eMBB service to provide the URLLC service in the nature of the URLLC service instead of the eMBB service data. In the case of allocating part of the resources reserved for the eMBB service to provide the URLLC service, the terminal (user equipment (UE)) (e.g., eMBB terminal) receiving the eMBB service may mis-recognize and mis-handle URLLC service data as eMBB service data. This may cause significant data reception performance degradation of the terminal in view of receiving the eMBB service.

Figure 2:
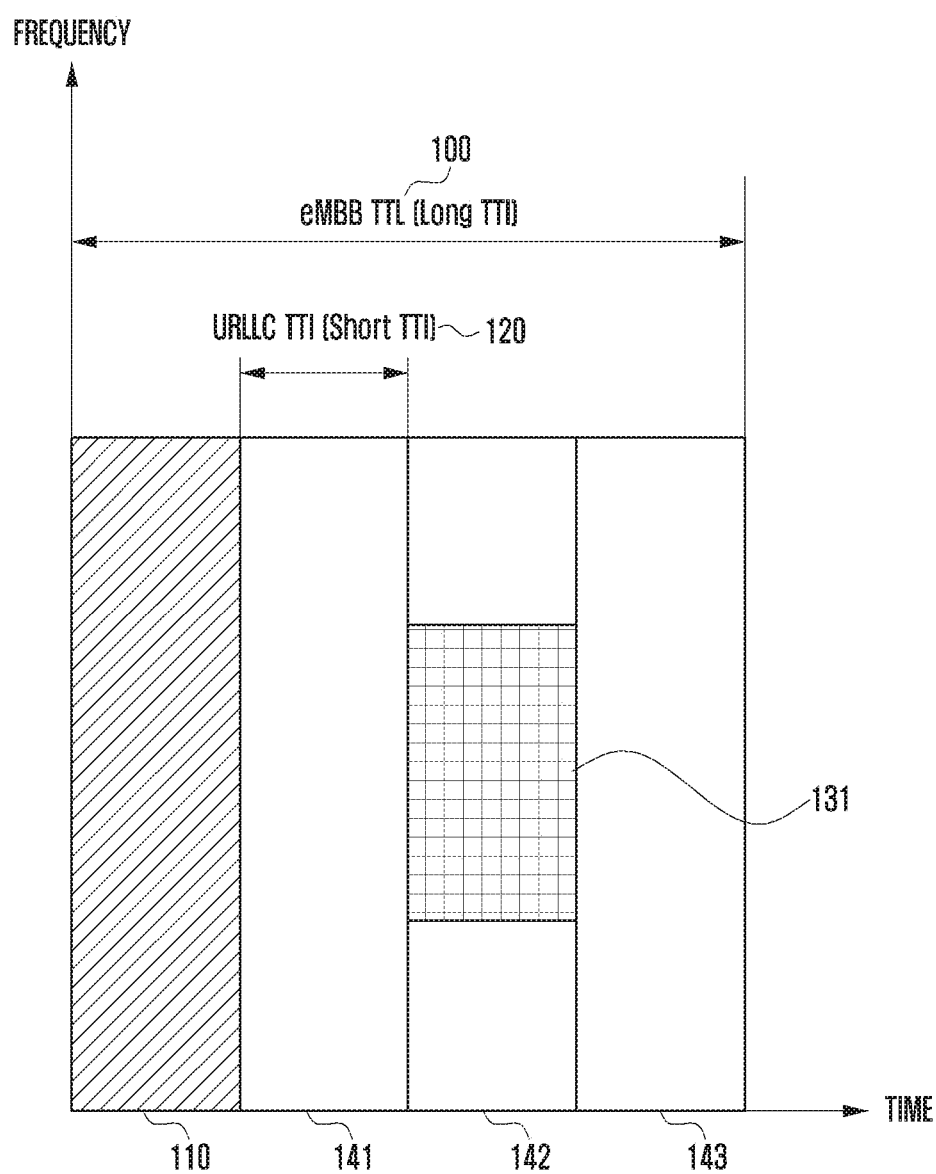
FIG. 2 is a diagram exemplifying resources for providing eMBB and ultra-reliable and low latency communication (URLLC) services simultaneously according to an embodiment of the disclosure.

FIG. 1 is a diagram exemplifying resources for providing an eMBB service according to an embodiment of the disclosure, and FIG. 2 is a diagram exemplifying resources for providing eMBB and URLLC services simultaneously according to an embodiment of the disclosure.

A description is made of the resources for providing the eMBB and URLLC services with reference to FIGS. 1 and 2.

FIG. 1 is a diagram for explaining a resource allocation unit for providing the eMBB service in a wireless communication system, and FIG. 2 is a diagram for explaining a situation where a resource region reserved for the eMBB service is allocated for providing the URLLC service.

Referring to FIG. 1, the horizontal axis denotes time resources, and the vertical axis denotes frequency resources. In the wireless communication system, the resource allocation is performed in unit of frequency and time resource. In the embodiment of FIG. 1, the unit of frequency is defined by a predetermined frequency band or a predetermined number of frequency resources. The time resource may be allocated in the same form or different forms for the respective services in a 5G wireless communication system. FIG. 1 exemplifies a case of allocating time resources for the eMBB service. For the eMBB service, a time resource allocation unit, namely TTI is a long TTI 100. The long TTI 100 being allocated for the eMBB service may include a period 110 for transmitting eMBB control information (also interchangeably referred to as eMBB control channel, eMBB control region, and eMBB control period) and a period 140 for transmitting eMBB service data (also interchangeably referred to as eMBB data channel, eMBB data period, and eMBB data region).

Referring to FIG. 2, a comparison is made between the eMBB and URLLC service resources. As assumed above, it is assumed that that a frequency resource unit is defined by a predetermined frequency band or a predetermined number of frequency resources. As described above, the long TTI 100 is used as the resource allocation unit for the eMBB service and may include the period 110 for transmitting the eMBB control channel conveying control information and the period 140 for transmitting eMBB service data.

For the URLLC service, it may be possible to allocate resources in time period units of a short TTI 120 instead of the long TTI 100. According to an embodiment of the disclosure, a URLLC data transmission period of the long TTI 100 may include a time period unit corresponding to two or more short TTIs 120. FIG. 2 exemplifies a case where data transmission period 140 of the long TTI 100 includes three short TTIs 141, 142, and 143. However, the data transmission period 140 of the long TTI 100 may be configured to include more than or less than the three short TTIs 141, 142, and 143 shown in FIG. 2.

The TTI 100 for eMBB may be, interchangeably and without distinction, referred to as eMBB TTI, long TTI, normal TTI, and first TTI to indicate the TTI applied for the eMBB service. The TTI 120 for URLLC may be, interchangeably and without distinction, referred to as URLLC TTI, short TTI, and second TTI to indicate the TTI applied for the URLLC service.

Hereinafter, the respective services are described on the basis of the explanation made with reference to FIGS. 1 and 2. As described above, the wireless communication system may allocate resources in units of eMBB TTI, i.e., long TTI 100, for providing a terminal with the eMBB service. As described with reference to FIG. 1, an eMBB TTI 100 may be composed of an eMBB control channel 110 for conveying the control information and an eMBB data channel 140 for conveying eMBB service data. The base station may transmit the eMBB control channel 110 including the control information for use by the terminal in receiving the eMBB service data 140. Accordingly, the eMBB UE may receive the eMBB control channel 110 and perform demodulation and decoding on the eMBB data channel 140 based on the control information conveyed in the eMBB control channel 110.

The URLLC data 131 is data requiring ultra-low latency and high reliability. Accordingly, if the URLLC data 131 occur in a burst manner, the base station has to transmit the URLLC data 131 immediately. In this respect, it is necessary to allocate resources in units of a very short TTI 120 as exemplified in FIG. 2 and transmit to the terminal the URLLC data 131 immediately upon its occurrence. Since the URLLC data 131 should be transmitted at the short TTI 120, it may occur that all of the available frequency resources, e.g., frequency resources for transmitting the URLLC data 131, are already allocated to other terminals. In this case, it may be preferred for the URLLC service to have a priority higher than that of the eMBB service. Accordingly, the base station may allocate a portion of the resources reserved for the eMBB service as the resources for URLLC service to transmit the URLLC data 131.

FIG. 2 exemplifies a case where part of the eMBB resource 100 allocated to a certain terminal is re-allocated as the resource for transmitting the URLLC data 131. In the case of using a part of the eMBB resource 100 for transmitting the URLLC data 131, the eMBB data (eMBB packet) to be transmitted to the terminal may also be mapped to the eMBB data region 140. Accordingly, a base station may puncture or remove the eMBB data allocated a portion of the eMBB data region 140, and insert (allocate) the URLLC data (URLLC packet) 131 to be transmitted to the terminal to the resource where the eMBB data has been punctured or removed and transmit the URLLC data. In the case where the base station punctures or removes the data mapped to part of the eMBB data region 140 and inserts the URLLC data 131 to the corresponding resource where the eMBB data has been punctured or removed, the eMBB terminal may receive other data as well as the data destined for the terminal in the resource region allocated to the terminal (i.e., the data received by the terminal may include the URLLC data 131 destined for any other terminal as well as the eMBB data destined for the terminal).

If the eMBB terminal receives the URLLC data 131 destined for any other terminal during the long TTI 100 allocated to the eMBB terminal, the eMBB terminal performs demodulation and decoding on the data including the URLLC data 131 that is not destined to the eMBB terminal, resulting in a significant data reception error. In this case, the eMBB terminal may request to the base station for retransmission of the unsuccessfully demodulated and decoded data. In the case of using a hybrid automatic repeat request (HARQ) scheme for combining the received data, the terminal is likely to perform decoding on the data that has already been determined as the wrong data (i.e., URLLC data 131 destined for any other terminal) and thus request for retransmission more frequently than a normal case. As a consequence, the unintended retransmission requests caused by the URLLC data 131 results in unnecessary power waste of the terminal as well as bandwidth waste.

In order to solve the above problems, it may be possible to consider a method for the base station to transmit an indicator indicating whether the signal previously transmitted through the eMBB control channel 110 includes a part conveying the URLLC data 131 and which part conveys the URLLC data 131 when the base station performs retransmission. The URLLC data 131 part and position indicator may be the information indicating whether there is the puncturing region from which any puncturing has been performed on the signal previously transmitted to the terminal and the position where the puncturing has been made. The base station may send the terminal a control signal including the information indicating whether there is any puncturing region in the previously transmitted signal when performing the HARQ retransmission (after current eMBB TTI). Meanwhile, if the above indication information is transmitted during the eMBB TTI after the transmission of the URLLC data 131, i.e., HARQ retransmission eMBB TTI, the corresponding indication information is referred to as indication information conveyed in HARQ retransmission eMBB TTI for convenience of explanation.

With this method, the terminal may puncture the URLLC data part 131 of the previously received signal based on information acquired from the control channel 110 of the retransmitted signal, combine the processed signal with the newly received signal, and perform demodulation and decoding on the combined signal, thereby improving performance in comparison with the legacy method.

However, the initially transmitted eMBB signal impacted by the URLLC data 131 is likely to be erroneous at the corresponding terminal; thus, the corresponding terminal needs to request the base station for retransmission. There is therefore a need of a method for improving the reception performance of the initially transmitted eMBB signal impacted by the URLLC data 131.

In order to accomplish this, in the case of providing the URLLC service using a part of the resources allocated for the eMBB service as shown in FIG. 2, it may be necessary to transmit to the terminal an indicator indicating the use of the eMBB resource for the URLLC service during the current eMBB TTI carrying the URLLC data 131 in an explicit or implicit manner in order for the eMBB terminal to recognize. In this case, the URLLC data 131 may occur after the transmission of the eMBB control channel 110; it is necessary to designate a part of eMBB data transmission resource region 140 after the URLLC data 131 for indication information transmission in a fixed or variable manner. For example, the base station may use a part of the last data region 143 of the eMBB data region 140, in a fixed or variable manner, to indicate the transmission of the URLLC data 131. If the indication information transmitted as above is received, the terminal may perform demodulation and decoding on the currently received signal with the exclusion of the URLLC data 131, resulting in considerable performance improvement in comparison with the legacy method. Meanwhile, if the above indication information is transmitted during the eMBB TTI 100 carrying URLLC data 131, the corresponding indication information is referred to as indication information conveyed in impacted eMBB TTI for convenience of explanation.

According to an embodiment of the disclosure, the eNB may use both the methods for indicating whether there is a part of URLLC data 131 and which part carries the URLLC data 131 when performing HARQ retransmission (after current eMBB TTI) and transmitting the indication information during the eMBB TTI 100 conveying the URLLC data 131 in an explicit or implicit manner.

However, if all base stations and terminals are forced to use one or both of the two above described indication information transmission methods, this may cause significant restriction to the system administration. For example, a base station that is not burdened with eMBB retransmission along with the URLLC transmission may prefer to use the method of transmitting the indication information through the control channel in HARQ retransmission. As detection of the URLLC indication information in the current eMBB resource region may increase the implementation complexity of the terminal, there may also be a terminal that prefers not to use this indication information transmission method. In a network in which the URLLC data occur frequently, there may be a base station that does not want to have the burden of the eMBB retransmission along with the URLLC transmission, and a terminal with high capability may prefer not to use eMBB retransmission impacted by URLLC in order to increase communication speed.

The disclosure provides a method and apparatus for applying adaptively a scheme for a base station to transmit the information indicating URLLC resource allocation in performing HARQ retransmission and a scheme for a base station to transmit the information indicating allocation of URLLC resource in the current eMBB data resource when URLLC data occur. The method of transmitting the information indicating the URLLC resource allocation in the current eMBB data resource region is referred to as a first indication information transmission method, and the method of transmitting the information indicating the URLLC resource allocation in performing retransmission is referred to as a second indication information transmission method.

Descriptions are made of the indication information configuration method for improving resource utilization efficiency based on the indication information and the operation methods of the base station and terminal for supporting the indication information configuration method in the case both the two indication information transmission methods are applied.

The interference occurring in the URLLC data 131 may be interchangeably referred to as URLLC interference, URLLC interference signal, interference impact signal, and URLLC interference impact signal for convenience of explanation. The information on the presence of the URLLC data when an interference caused by the URLLC data 131 occurs in the eMBB data 140 and the resource position of the URLLC data 131 may be interchangeably referred to as URLLC resource allocation information indication information, URLLC resource allocation indication information, URLLC-related information, URLLC interference signal-related information, interference signal information, interference impact information, interference impact identification information, and interference impact indication information.

<Adaptive Indication Information Transmission Method>

Figure 3:
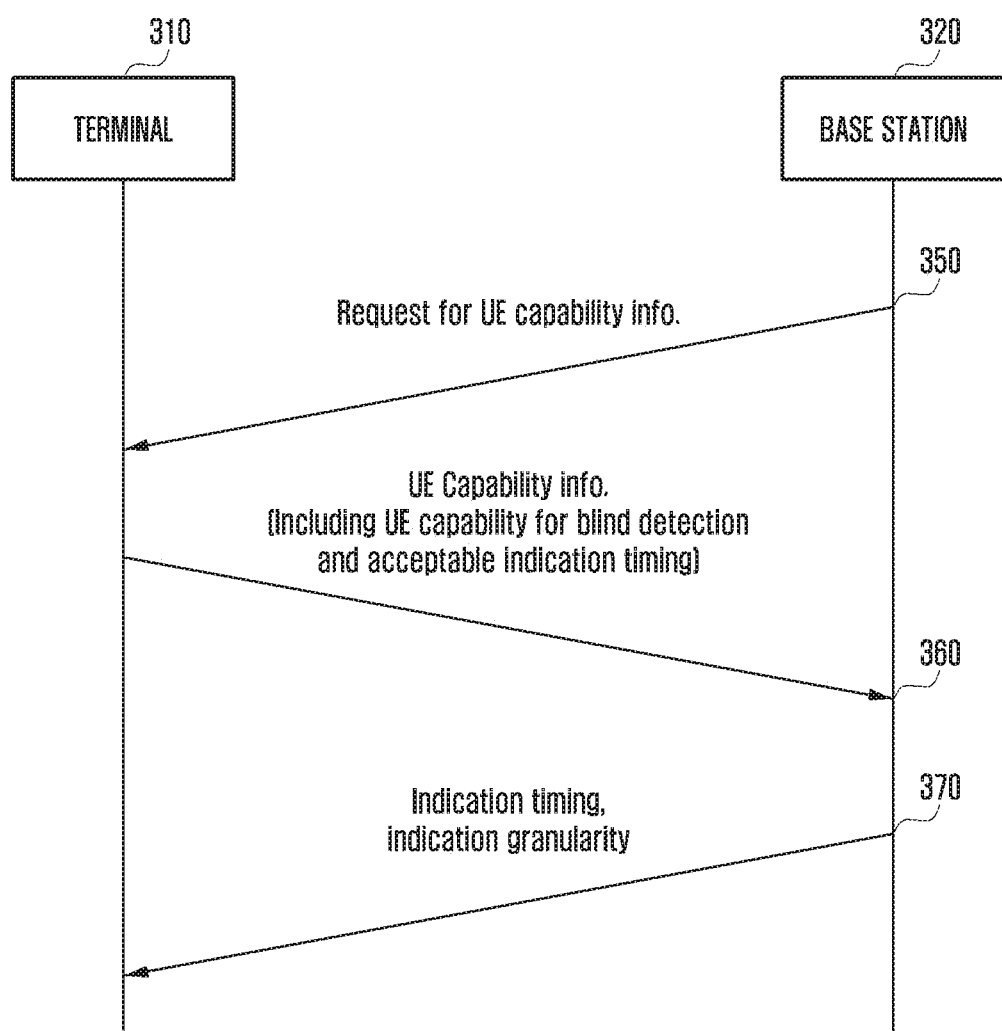
FIG. 3 is a signal flow diagram illustrating a method for adaptively indicating presence/absence of partial puncturing of eMBB data according to an embodiment of the disclosure.

FIG. 3 is a signal flow diagram illustrating a method for adaptively indicating presence/absence of partial puncturing of eMBB data according to an embodiment of the disclosure.

Referring to FIG. 3, it may be possible to adaptively apply the method for a base station to transmit the interference impact information to a terminal during an eMBB TTI, impacted eMBB TTI, punctured eMBB TTI, or current eMBB TTI carrying URLLC data and the method for the base station to transmit the interference impact information to the terminal during the eMBB TTI (HARQ retransmission eMBB TTI, after-current eMBB TTI, or retransmission eMBB TTI) carrying the retransmission signal in response to a retransmission request signal from the terminal.

In order to accomplish this, the base station may use a method of transmitting the interference impact information based on terminal capability (UE capability) (e.g., interference impact information transmission timing and/or granularity). According to an embodiment of the disclosure, the base station may adaptively use a method of transmitting the interference impact information in consideration of base station capability (gNB capability) along with the terminal capability.

The interference impact information transmission timing (indication timing) may indicate the timing for transmitting the interference impact information (URLLC resource allocation information). For example, the interference impact information transmission timing (indication timing) may include at least one of the interference impact information transmission timing during the eMBB TTI (during current eMBB TTI) carrying the URLLC data 131, the interference impact information transmission timing during the HARQ retransmission eMBB TTI (after current eMBB TTI), and the interference impact information transmission timing during both the current eMBB TTI and HARQ retransmission TTI.

The term "granularity" denotes the degree or unit of precision for indicating the position of the URLLC data in the eMBB resource region by the base station to the terminal.

In reference to FIGS. 1 and 2, the eMBB TTI 100 may be composed of a plurality of short TTIs 141, 142, and 143. The long TTI 100 may be referred to as a slot and the short TTIs 141, 142, and 143 as mini-slots. The short TTIs 141, 142, and 143 may be sorted into at least one group called a mini-slot group. Although FIG. 2 depicts three mini-slots 141, 142, and 143, the data region of the long TTI 100 may be composed of 4 mini-slots. In this case, a first mini-slot group may be composed of the first and second mini-slots, and a second mini-slot group may be composed of the third and fourth mini-slots. The mini-slot groups may be composed of the same number of mini-slots or different numbers of mini-slots.

The base station may notify the terminal of the position of the URLLC data in the eMBB resource region by mini-slot group. The base station may also notify the terminal of the position of the URLLC data in the eMBB resource region by mini-slot. The base station may also notify the terminal of the position of the URLLC data in the eMBB resource region by code block (CB) or transport block (TB). In this case, the granularity may indicate at least one of a mini-slot, mini-slot group, CB, and TB (or physical resource block (PRB)).

According to an embodiment of the disclosure it may be possible to consider whether the terminal has a blind detection capability in determining the interference impact information transmission method. Determining whether the terminal has a blind detection capability may be determining whether the terminal can blindly detect the interference impact information. If the terminal has the blind detection capability, the base station may transmit to the terminal brief information indicating presence/absence of URLLC data and, if present, the position of the URLLC data for use by the terminal in performing blind detection in an implicit and/or explicit manner such that the terminal detects the detailed URLLC-related information based on the brief information. If the terminal supports blind detection, the base station may transmit schematic URLLC-related information to the terminal so as to reduce considerably the resources for transmitting the indication information. In the opposite case where the terminal does not support blind detection, the base station may explicitly transmit to the terminal the detailed URLLC-related information on the presence/absence of the URLLC data in the eMBB resource region and, if present, the position of the URLLC data. According to an embodiment of the disclosure, if the terminal supports blind detection, the base station may transmit the URLLC-related information to the terminal implicitly or explicitly.

According to an embodiment of the disclosure, the interference impact information position in a resource region may be determined per terminal (UE-specific). For example, the interference impact information for a first terminal may be located in a first resource region, and the interference impact information for a second terminal may be located in a second resource region. According to an embodiment of the disclosure, the interference impact information position in a resource region may be determined per base station (cell-specific). For example, the interference impact information to be transmitted by a first base station may be located in a first resource region, and the interference impact information to be transmitted by a second base station may be located in a second resource region.

A description is made of the detailed procedure. In reference to FIG. 3, the base station 320 may request to the terminal 310 for Terminal capability information at operation 350.

The terminal 310 may send Terminal capability information to the base station 320 at operation 360. The Terminal capability information may include information on the interference impact information transmission timing of the terminal 310.

According to an embodiment of the disclosure, the Terminal capability information may include information indicating whether the terminal 310 is capable of detecting interference impact information during the eMBB TTI carrying the URLLC data. According to an embodiment of the disclosure, the Terminal capability information may include information indicating whether the terminal 310 is capable of detecting interference impact information in the eMBB TTI carrying a retransmission signal (HARQ retransmission eMBB TTI). According to an embodiment of the disclosure, the Terminal capability information may include information indicating whether the terminal 310 supports blind detection. For example, the Terminal capability information may include the information indicating whether the terminal is capable of detecting explicit and/or implicit interference impact information in the eMBB TTI carrying the URLLC data. The Terminal capability information may also include the information indicating whether the terminal 310 is capable of detecting explicit and/or implicit interference impact information during the eMBB TTI carrying the retransmission signal.

At operation 370, the base station 320 may determine the transmission timing and/or granularity of the puncturing information in consideration of the capabilities of the base station 320 and the terminal 310. The base station 320 may send the terminal 310 the information on the determined interference impact information transmission method. The terminal 310 may operate based on the received information.

According to an embodiment of the disclosure, the terminal capability information may include information on the terminal-preferred interference impact information transmission timing. For example, if the terminal 310 is capable of detecting the interference impact information during the eMBB TTI carrying the URLLC data (impacted eMBB TTI) or during the eMBB TTI carrying the retransmission signal (HARQ retransmission eMBB TTI), the terminal 310 may notify the base station 320 of its preferred interference impact information transmission timing. In this case, the base station 320 may determine the interference impact information transmission timing based on the terminal-preferred interference impact information transmission timing information. If the base station 320 determines that the terminal-preferred interference impact information transmission timing is not appropriate, the base station 320 may ignore the terminal-preferred interference impact information transmission timing information, determine a more appropriate transmission timing, and notify the terminal 310 of the determined transmission timing.

According to an embodiment of the disclosure, the terminal capability information may include information on a terminal-preferred granularity. For example, if the terminal 310 has a high blind detection capability, the terminal 310 may prefer the method of indicating the URLLC position by mini-slot group. The terminal 310 may notify the base station 320 that the terminal-preferred granularity is mini-slot group. In this case, the base station 320 may determine the granularity based on the terminal-preferred granularity information. If the base station 320 determines that the terminal-preferred granularity is not appropriate, the base station 320 may ignore the terminal-preferred granularity information, determine a more appropriate granularity, and notify the terminal 310 of the determined granularity.

Operation 360 is described in more detail.

At operation 360, the terminal capability (UE capability) information transmitted from the terminal 310 to the base station 320 may further include new information. This new information may include information on the interference impact information transmission timing supported by the terminal 310 and information indicating whether the terminal is capable of blindly detecting the interference impact information.

The new information may include 3-bit information.

The first bit ($1^{st}$ bit) may indicate whether the terminal 310 is capable of detecting an indicator of interference impact information (puncturing information) during the current eMBB TTI and the indicator may be 1 bit unit. For example, the first bit may be set to 1 for the case where the terminal 310 is capable of detecting the indicator during the current eMBB TTI and 0 for the opposite case, or vice versa.

The second bit ($2^{nd}$ bit) may indicate whether the terminal 310 is capable of detecting an indicator of interfere impact information (puncturing information) after the current eMBB TTI the indicator may be 1 bit unit. For example, the second bit may be set to 1 for the case where the terminal 310 is capable of detecting the indicator after current the eMBB TTI and 0 for the opposite case, or vice versa.

The third bit ($3^{rd}$ bit) may indicate whether the terminal 310 is capable of blindly detecting interference impact information. For example, the third bit may be set to 1 for the case where the terminal 310 is capable of blindly detecting interference impact information during current eMBB TTI and 0 for the opposite case, or vice versa.

For example, if the three bits of the information are "111," this may indicate that the terminal 310 is capable of detecting interference impact information indication information during the current eMBB TTI (first bit=1), capable of detecting interference impact information indication information after the current eMBB TTI (second bit=1), and capable of blindly detecting interference impact information during the current eMBB TTI (third bit=1). If the three bits of the information are "110," this may indicate that the terminal 310 is capable of detecting interference impact information indication information during the current eMBB TTI (first bit=1), capable of detecting interference impact information indication information after the current eMBB TTI (second bit=1), and incapable of blindly detecting interference impact information during the current eMBB TTI (third bit=0).

Operation 370 is described in more detail hereinafter.

The base station 320 may determine the transmission timing and granularity of the interference impact information (puncturing information) to be actually used in consideration of the capabilities of the eNB 320 and the terminal 310. The base station 320 may determine the interference impact information transmission timing and granularity to be actually used in consideration of the information on the interference impact information transmission timing supported by the terminal 310, the information on whether the terminal 310 is capable of blindly detecting the interference impact information, and the information on the granularity preferred by the terminal 310 that are included in the terminal capability (UE capability) information received from the terminal 310. The base station 320 may determine the interference impact information transmission timing and granularity to be actually used in further consideration of the interference impact information transmission timing and granularity it can support.

For example, the interference impact information transmission timing supportable by the base station 320 may be during current eMBB TTI, after current eMBB TTI, and both of the during current eMBB TTI and the after current eMBB TTI, the granularity supportable by the base station 320 may be one of mini-slot, mini-slot group, CB, and PRB (TB).

The base station 320 may determine the interference impact information transmission timing and granularity to be actually used in consideration of the interference impact information transmission timing supportable by the terminal 310 and the information on whether the terminal is capable of blindly detecting the interference impact information.

For example, the base station 320 may receive, at operation 360, from the terminal 310, the information indicating that the terminal 310 is capable of detecting the interference impact information indication information during current eMBB TTI, capable of detecting the interference impact information indication information after current eMBB TTI, and capable of blind detection of the interference impact information during the current eMBB TTI. The terminal capability information may include the new information set to "111." In this case, the base station 320 may determine the interference impact information transmission timing available both during and after the current eMBB TTI. The base station 320 may also determine the granularity of mini-slot group for use during the current eMBB TTI. The terminal 310 is capable of detecting the position of the URLLC data, even when the base station 320 notifies the terminal 310 of the position of the URLLC data by mini-slot group as a large region during the current eMBB TTI because the terminal 310 supports blind decoding during the current eMBB TTI. The base station 320 may also determine the granularity of mini-slot (or PRB) for use after the current eMBB TTI. This aims to notify the terminal 310 of the accurate position of the URLLC data in order for the terminal 310 to perform eMBB data signal demodulation and decoding more accurately in the case of receiving a retransmission signal. According to an embodiment of the disclosure, the base station 320 may also determine the granularity of mini-slot, CB, or PRB instead of mini-slot group for use during the current eMBB TTI and mini-slot group or CB for use after the current eMBB TTI. According to an embodiment of the disclosure, the base station 320 may determine the interference impact information transmission timing during and/or after the current eMBB TTI in consideration of additional information such as communication channel quality.

At operation 360, the base station 320 may receive, from the terminal 310, information indicating that the terminal 310 is capable of detecting the interference impact information indication information both during and after the current eMBB TTI and incapable of blindly detecting the interference impact information during the current eMBB TTI. For example, the terminal capability information may include the new information set to "110." In this case, the base station 320 may determine the interference impact information transmission timing available both during and after the current eMBB TTI. According to an embodiment of the disclosure, the base station 320 may determine the interference impact information transmission timing available both during and after the current eMBB TTI in consideration of additional information such as communication channel quality. The base station 320 may determine the granularity of mini-slot (or PRB) during the current eMBB TTI. This aims to notify the terminal 310 of the accurate position of the URLLC data to perform eMBB data signal demodulation and decoding more accurately even during the current eMBB TTI because the terminal 310 supports blind decoding during the current eMBB TTI. The base station 320 may also determine the granularity of mini-slot (or PRB) for use after the current eMBB TTI. According to an embodiment of the disclosure, the base station 320 may also determine the granularity of mini-slot group or CB both during and after the current eMBB TTI.

At operation 360, the base station 320 may receive from the terminal 310 the information indicating that the terminal 310 is capable of detecting the interference impact information indication information and blindly detecting the interference impact information during the current eMBB TTI and is incapable of detecting the interference impact information indication information after the current eMBB TTI. For example, the terminal capability information may include the new information set to "101." In this case, the base station 320 may determine the interference impact information transmission timing available during the current eMBB TTI. This is because the terminal 310 cannot receive the interference impact information after the current eMBB TTI. The base station 320 may also determine the granularity of mini-slot group for use during the current eMBB TTI. The terminal 310 is capable of detecting the position of the URLLC data even when the base station 320 notifies the terminal 310 of the position of the URLLC with the granularity of mini-slot group as a large region during the current eMBB TTI because the terminal 310 supports blind decoding. The base station 320 may determine the granularity of mini-slot, CB, or PRB for use by the terminal 310 to detect the position of the URLLC data more accurately. This aims to make it possible for the base station 320 to notify the terminal 310 of the position of the URLLC data more accurately at a time because the terminal 310 cannot receive the interference impact information after the current eMBB TTI.

At operation 360, the base station 320 may receive from the terminal 310 the information indicating that the terminal 310 is capable of detecting the interference impact information indication information during the current eMBB TTI and is incapable of detecting the interference impact information indication information after the current eMBB TTI and of blindly detecting the interference impact information during the current eMBB TTI. For example, the terminal capability information may include the new information set to "100." In this case, the base station 320 may determine the interference impact information transmission timing available during the current eMBB TTI. This is because the terminal 310 cannot receive the interference impact information after the current eMBB TTI. The base station 320 may also determine the granularity of mini-slot (or PRB) for use during the current eMBB TTI. This aims to notify the terminal 310 of the accurate position of the URLLC data in order for the terminal 310 to perform eMBB data signal demodulation and decoding more accurately during the current eMBB TTI because the terminal 310 does not support blind detection during the current eMBB TTI. According to an embodiment of the disclosure, the base station 320 is capable of determining the granularity of mini-slot group or CB for use during the current eMBB TTI.

At operation 360, the base station 320 may receive from the terminal 310 the information indicating that the terminal 310 is incapable of detecting the interference impact information indication information during the current eMBB TTI and is capable of detecting the interference impact information indication information after the current eMBB TTI and blindly detecting the interference impact information during the current eMBB TTI. For example, the terminal capability information may include the new information set to "011." In this case, the base station 320 may determine the interference impact information transmission timing available after the current eMBB TTI. This is because the terminal 310 cannot receive the interference impact information during the current eMBB TTI. The base station 320 may also determine the granularity of mini-slot (or PRB) for use after the current eMBB TTI. This aims to make it possible for the base station 320 to notify the terminal 310 of the position of the URLLC data accurately at a time because the terminal 310 cannot receive the interference impact information during the current eMBB TTI. According to an embodiment of the disclosure, the base station 320 is capable of determining the granularity of mini-slot group or CB for use after the current eMBB TTI.

At operation 360, the base station may receive from the terminal 310 the information indicating that the terminal 310 is incapable of detecting the interference impact information indication information and blindly detecting the interference impact information during the current eMBB TTI and is capable of detecting the interference impact information indication information after the current eMBB TTI. For example, the terminal capability information may include the new information set to "010." In this case, the base station 320 may determine the interference impact information transmission timing available after the current eMBB TTI. This is because the terminal 310 cannot receive the interference impact information during the current eMBB TTI. The base station 320 may also determine the granularity of mini-slot (or PRB) for use after the current eMBB TTI. This aims to make it possible for the base station 320 to notify the terminal 310 of the position of the URLLC data accurately at a time because the terminal 310 cannot receive the interference impact information during the current eMBB TTI. According to an embodiment of the disclosure, the base station 320 is capable of determining the granularity of mini-slot group or CB available after the current eMBB TTI.

At operation 360, the base station 320 may receive from the terminal 310 the information indicating that the terminal 310 is incapable of detecting the interference impact information indication information both during and after the current eMBB TTI and is capable of blindly detecting the interference impact during the current eMBB TTI. For example, the terminal capability information may include the new information set to "001." In this case, the base station 320 may determine the interference impact information transmission timing available after the current eMBB TTI. The base station 320 may also determine the granularity of the TB-unit NDI (new data indicator) available after the current eMBB TTI. Although the terminal 310 cannot receive the interference impact information both during and after the current eMBB TTI, the base station 320 may use the granularity of the TB-unit NDI to transmit the interference impact information to the terminal 310 after the current eMBB TTI.

At operation 360, the base station 320 may receive from the terminal 310 the information indicating that the terminal 310 is incapable of detecting the interference impact information indication information both during and after the current eMBB TTI and blindly detecting the interference impact information during the current eMBB TTI. For example, the terminal capability information may include the new information set to "000." In this case, the base station 320 may determine the interference impact information transmission timing available after the current eMBB TTI. Although the terminal cannot receive the interference impact information both during and after the current eMBB TTI, the base station 320 may transmit the interference impact information to the terminal 310 after the current eMBB TTI using the TB-unit NDI.

According to another embodiment of the disclosure, the interference impact information transmission timing supportable by the base station 320 may be determined for use during the current eMBB TTI, and the granularity supportable by the base station 320 may be determined as mini-slot, mini-slot group, CB, or PRB (TB).

The base station 320 may determine the interference impact information transmission timing and granularity to be actually used in consideration of the interference impact information transmission timing supportable by the terminal 310 and the information on whether the terminal 310 is capable of blindly detecting the interference impact information.

For example, at operation 360, the base station 320 may receive from the terminal 310 the information indicating that the terminal 310 is capable of detecting the interference impact information indication information both during and after the current eMBB TTI and blindly detecting the interference impact information during the current eMBB TTI. For example, the terminal capability information may include the new information set to "111." In this case, the base station 320 may determine the interference impact information transmission timing available during the current eMBB TTI. This is because the base station 320 cannot transmit the interference impact information after the current eMBB TTI even though the terminal 310 is capable of receiving the interference impact information both during and after the current eMBB TTI. The base station 320 may also determine the granularity of mini-slot group for use during the current eMBB TTI. The terminal 310 is capable of detecting the position of the URLLC data even though the base station 320 notifies the terminal 310 of the position of the URLLC data by mini-slot group as a large region during the current eMBB TTI because the terminal 310 supports blind decoding during the current eMBB TTI. The base station 320 may also determine the granularity of mini-slot, CB, or PRB available in order for the terminal 310 to locate the position of the URLLC data more accurately. This aims to make it possible for the base station 320 to notify the terminal 310 of the position of the URLLC data more accurately at a time because the base station 320 cannot transmit the interference impact information after the current eMBB TTI.

At operation 360, the base station 320 may receive from the terminal 310 the information indicating that the terminal is capable of detecting the interference impact information indication information both during and after the current eMBB and is incapable of blindly detecting the inference impact information during the current eMBB TTI. For example, the terminal capability information may include the new information set to "110." In this case, the base station 320 may determine the interference impact information transmission timing available during the current eMBB TTI. This is because the base station 320 cannot transmit the interference impact information after the current eMBB TTI even though the terminal 310 is capable of receiving the interference impact information both during and after the current eMBB TTI. The base station 320 may also determine the granularity of mini-slot (or PRB) for use during the current eMBB TTI. This aims to notify the terminal 310 of the accurate position of the URLLC data because the terminal 310 does not support blind detection during the current eMBB TTI. According to an embodiment of the disclosure, the base station 320 may determine the granularity of mini-slot group or CB for use during the current eMBB TTI.

At operation 360, the base station 320 may receive from the terminal 310 the information indicating that the terminal 310 is capable of detecting the interference impact information indication information and blindly detecting the interference impact information during the current eMBB TTI and is incapable of detecting the interference impact information indication information after the current eMBB TTI. For example, the terminal capability information may include the new information set to "101." In this case, the base station 320 may determine the interference impact information transmission timing available during the current eMBB TTI. This is because the terminal 310 cannot receive the interference impact information after the current eMBB TTI and the base station 320 cannot transmit the interference impact information after the current eMBB TTI. The base station 320 may also determine the granularity of mini-slot group for use during the current eMBB TTI. The terminal 310 is capable of detecting the position of the URLLC data even though the base station 320 notifies the terminal 310 of the position of the URLLC data with the granularity of mini-slot group as a large region during the current eMBB TTI because the terminal 310 supports blind decoding. The base station 320 may determine the granularity of mini-slot, CB, or PRB for use by the terminal 310 to detect the position of the URLLC data more accurately. This aims to make it possible for the base station 320 to notify the terminal 310 of the position of the URLLC data more accurately at a time because the terminal 310 cannot receive the interference impact information after the current eMBB TTI.

At operation 360, the base station 320 may receive from the terminal 310 the information indicating that the terminal 310 is capable of detecting the interference impact information indication information during the current eMBB TTI and is incapable of detecting the interference impact information indication information after the current eMBB TTI and of blindly detecting the interference impact information during the current eMBB TTI. For example, the terminal capability information may include the new information set to "100." In this case, the base station 320 may determine the interference impact information transmission timing available during the current eMBB TTI. This is because the terminal 310 cannot receive the interference impact information after the current eMBB TTI and the base station 320 cannot transmit the interference impact information after the current eMBB TTI. The base station 320 may also determine the granularity of mini-slot (or PRB) for use during the current eMBB TTI. This aims to notify the terminal 310 of the accurate position of the URLLC data in order for the terminal 310 to perform eMBB data signal demodulation and decoding more accurately during the current eMBB TTI because the terminal 310 does not support blind detection during the current eMBB TTI. According to an embodiment of the disclosure, the base station 320 is capable of determining the granularity of mini-slot group or CB for use during the current eMBB TTI.

At operation 360, the base station 320 may receive from the terminal 310 the information indicating that the terminal 310 is incapable of detecting the interference impact information indication information during the current eMBB TTI and is capable of detecting the interference impact information indication information after the current eMBB TTI and blindly detecting the interference impact information during the current eMBB TTI. For example, the terminal capability information may include the new information set to "011." In this case, the base station 320 may determine the interference impact information transmission timing available after the current eMBB TTI. The base station 320 may also determine the granularity of the TB-unit NDI to be used. The base station 320 may use the TB-unit NDI to transmit the interference impact information to the terminal 310 after the current eMBB TTI because the terminal 310 cannot receive the interference impact information during the current eMBB TTI and the base station cannot transmit the interference impact information after the current eMBB TTI.

At operation 360, the base station may receive from the terminal 310 the information indicating that the terminal 310 is incapable of detecting the interference impact information indication information and of blindly detecting the interference impact information during the current eMBB TTI and is capable of detecting the interference impact information indication information after the current eMBB TTI. For example, the terminal capability information may include the new information set to "010." In this case, the base station may determine the interference impact information transmission timing available after the current eMBB TTI. The base station 320 may also determine the granularity of the TB-unit NDI to be used. The base station 320 may use the TB-unit NDI to transmit the interference impact information to the terminal 310 after the current eMBB TTI because the terminal 310 cannot receive the interference impact information during the current eMBB TTI and the base station cannot transmit the interference impact information after the current eMBB TTI.

At operation 360, the base station 320 may receive from the terminal 310 the information indicating that the terminal 310 is incapable of detecting the interference impact information indication information both during and after the current eMBB TTI and is capable of blindly detecting the interference impact during the current eMBB TTI. For example, the terminal capability information may include the new information set to "001." In this case, the base station 320 may determine the interference impact information transmission timing available after the current eMBB TTI. The base station 320 may also determine the granularity of the TB-unit NDI. The base station 320 may use the TB-unit NDI to transmit the interference impact information to the terminal 310 after the current eMBB TTI because the terminal 310 cannot receive the interference impact information both during and after the current eMBB TTI and the base station cannot transmit the interference impact information after the current eMBB TTI.

At operation 360, the base station 320 may receive from the terminal 310 the information indicating that the terminal 310 is incapable of detecting the interference impact information indication information both during and after the current eMBB TTI and of blindly detecting the interference impact information during the current eMBB TTI. For example, the terminal capability information may include the new information set to "000." In this case, the base station 320 may determine the interference impact information transmission timing available after the current eMBB TTI. The base station 320 may also determine the granularity of the TB-unit NDI. The base station 320 may use the TB-unit NDI to transmit the interference impact information to the terminal 310 after the current eMBB TTI because the terminal 310 cannot receive the interference impact information both during and after the current eMBB TTI and the base station cannot transmit the interference impact information after the current eMBB TTI.

According to another embodiment of the disclosure, the interference impact information transmission timing supportable by the base station 320 may be determined for use after the current eMBB TTI, and the granularity supportable by the base station 320 may be determined as mini-slot, mini-slot group, CB, or PRB (TB).

The base station 320 may determine the interference impact information transmission timing and granularity to be actually used in consideration of the interference impact information transmission timing supportable by the terminal 310 and the information on whether the terminal 310 is capable of blindly detecting the interference impact information.

For example, at operation 360, the base station 320 may receive from the terminal 310 the information indicating that the terminal 310 is capable of detecting the interference impact information indication information both during and after the current eMBB TTI and blindly detecting the interference impact information during the current eMBB TTI. For example, the terminal capability information may include the new information set to "111." In this case, the base station 320 may determine the interference impact information transmission timing available after the current eMBB TTI. This is because the base station 320 cannot transmit the interference impact information during the current eMBB TTI even though the terminal 310 is capable of receiving the interference impact information both during and after the current eMBB TTI. The base station 320 may also determine the granularity of mini-slot group for use after the current eMBB TTI. The base station 320 may also determine the granularity of mini-slot, CB, or PRB for use after current eMBB TTI in order for the terminal 310 to locate the position of the URLLC data more accurately. This aims to make it possible for the base station 320 to notify the terminal 310 of the position of the URLLC data more accurately at a time because the base station 320 cannot transmit the interference impact information during current eMBB TTI.

At operation 360, the base station 320 may receive from the terminal 310 the information indicating that the terminal is capable of detecting the interference impact information indication information both during and after the current eMBB and is incapable of blindly detecting the inference impact information during the current eMBB TTI. For example, the terminal capability information may include the new information set to "110." In this case, the base station 320 may determine the interference impact information transmission timing available after the current eMBB TTI. This is because the base station 320 cannot transmit the interference impact information during the current eMBB TTI even though the terminal 310 is capable of receiving the interference impact information both during and after the current eMBB TTI. The base station 320 may also determine the granularity of mini-slot group for use during the current eMBB TTI. The base station 320 may also determine the granularity of mini-slot, CB, or PRB for use during current eMBB in order for the terminal 310 to locate the position of the URLLC data more accurately. This aims to make it possible to notify the terminal 310 of the accurate position of the URLLC data at a time because the base station 320 cannot transmit the interference impact information during the current eMBB TTI.

At operation 360, the base station 320 may receive from the terminal 310 the information indicating that the terminal 310 is capable of detecting the interference impact information indication information and blindly detecting the interference impact information during the current eMBB TTI and is incapable of detecting the interference impact information indication information after the current eMBB TTI. For example, the terminal capability information may include the new information set to "101." In this case, the base station 320 may determine the interference impact information transmission timing available after the current eMBB TTI. The base station 320 may also determine the granularity of the TB-unit NDI to be used. The base station 320 may use the TB-unit NDI to transmit the interference impact information to the terminal 310 after the current eMBB TTI because the terminal 310 can receive the interference impact information during, but not after, the current eMBB TTI, and the base station cannot transmit the interference impact information during the current eMBB TTI.

At operation 360, the base station 320 may receive from the terminal 310 the information indicating that the terminal 310 is capable of detecting the interference impact information indication information during the current eMBB TTI and is incapable of detecting the interference impact information indication information after the current eMBB TTI and of blindly detecting the interference impact information during the current eMBB TTI. For example, the terminal capability information may include the new information set to "100." In this case, the base station 320 may determine the interference impact information transmission timing available after the current eMBB TTI. The base station 320 may also determine the granularity of the TB-based NDI to be used. The base station 320 may use the TB-unit NDI to transmit the interference impact information to the terminal 310 after the current eMBB TTI because the terminal 310 can receive the interference impact information during, but not after, the current eMBB TTI, and the base station cannot transmit the interference impact information during the current eMBB TTI.

At operation 360, the base station 320 may receive from the terminal 310 the information indicating that the terminal 310 is incapable of detecting the interference impact information indication information during the current eMBB TTI and is capable of detecting the interference impact information indication information after the current eMBB TTI and blindly detecting the interference impact information during the current eMBB TTI. For example, the terminal capability information may include the new information set to "011." In this case, the base station 320 may determine the interference impact information transmission timing available after the current eMBB TTI. This is because the terminal 310 can receive the interference impact information after the current eMBB TTI and the base station 320 cannot transmit the interference impact information during the current eMBB TTI. The base station 320 may also determine the granularity of mini-slot group for use after the current eMBB TTI. The base station 320 may also determine the granularity of mini-slot, CB, or PRB for use after current eMBB in order for the terminal 310 to locate the position of the URLLC data more accurately. This aims to make it possible for the base station 320 to notify the terminal 310 of the position of the URLLC data accurately at a time because the base station 320 cannot transmit the interference impact information during the current eMBB TTI.

At operation 360, the base station may receive from the terminal 310 the information indicating that the terminal 310 is incapable of detecting the interference impact information indication information and blindly detecting the interference impact information during the current eMBB TTI and is capable of detecting the interference impact information indication information after the current eMBB TTI. For example, the terminal capability information may include the new information set to "010." In this case, the base station 320 may determine the interference impact information transmission timing available after the current eMBB TTI. This is because the terminal is capable of receiving the interference impact information after the current eMBB TTI while the base station 320 cannot transmit the interference impact information during the current eMBB TTI. The base station 320 may also determine the granularity of mini-slot group for use after the current eMBB TTI. The base station 320 may also determine the granularity of mini-slot, CB, or PRB for use after current eMBB TTI in order for the terminal 310 to locate the position of the URLLC data more accurately. This aims to make it possible for the base station 320 to notify the terminal 310 of the position of the URLLC data accurately at a time because the base station 320 cannot transmit the interference impact information during the current eMBB TTI.

At operation 360, the base station 320 may receive from the terminal 310 the information indicating that the terminal 310 is incapable of detecting the interference impact information indication information both during and after the current eMBB TTI and is capable of blindly detecting the interference impact information during the current eMBB TTI. For example, the terminal capability information may include the new information set to "001." In this case, the base station 320 may determine the interference impact information transmission timing available after the current eMBB TTI. The base station 320 may also determine the granularity of the TB-unit NDI to be used. The base station 320 may use the TB-unit NDI to transmit the interference impact information after the current eMBB TTI because the base station 320 cannot transmit the interference impact information during the current eMBB TTI even though the terminal 310 can receive the interference impact information both during and after the current eMBB TTI.

At operation 360, the base station 320 may receive from the terminal 310 the information indicating that the terminal 310 is incapable of detecting the interference impact information indication information both during and after the current eMBB TTI and blindly detecting the interference impact information during the current eMBB TTI. For example, the terminal capability information may include the new information set to "000." In this case, the base station 320 may determine the interference impact information transmission timing available after the current eMBB TTI. The base station 320 may determine the granularity of the TB-unit NDI to be used. That is, the base station 320 may use the TB-unit NDI to transmit the interference impact information to the terminal after the current eMBB TTI because the base station 320 cannot transmit the interference impact information during the current eMBB TTI even though the terminal 310 can receive the interference impact information both during and after the current eMBB TTI.

As described above, the base station 320 may determine the interference impact information transmission timing and granularity information based on the terminal capability received from the terminal 310 and the base station capability and then transmit the interference impact information transmission timing and granularity information to the terminal 310. The terminal 320 may operate based on the received information.

The base station 320 may transmit the above-described information to the terminal 310 using downlink control information (DCI) or a radio resource control (RRC) message.

The signal transmitted from the base station 320 to the terminal 310 may be exemplified as shown in Table 1, but it is not limited thereto. The indication information may 4 bit information.

TABLE 1

| Transmission information | Timing | Granularity During | After |
|---|---|---|---|
| 1100 | Both | Mini-slot group | Mini-slot |
| 1101 | | | Mini-slot & PRB |
| 1110 | | Mini-slot | Mini-slot |
| 1111 | | | Mini-slot & PRB |
| 0100 | After | — | Mini-slot |
| 0101 | | — | Mini-slot & PRB |
| 0111 | | — | TB-unit DNI |
| 1011 | During | Mini-slot group | — |
| 1000 | | Mini-slot | — |
| 1001 | | Mini-slot & PRB | — |

Table 1 exemplifies the case where the base station 320 is capable of transmitting the interference impact information transmission timing during and/or after the current eMBB TTI. For example, the base station 320 may transmit to the terminal 310 the signal "1100" indicating that the interference impact information transmitting timing is available both during and after the current eMBB TTI and the granularity is the mini-slot group for use during the eMBB TTI and the mini-slot for use after the eMBB TTI.

The bitwidth for the indication information may be reduced according to the granularity. For example, if the mini-slot (& PRB) is not supported, the indication information may be expressed with 3 bits. If the base station 320 supports the interference impact information transmission timing available only during the current eMBB TTI, the indication information may be expressed with 2 bits. In this case, the indication information may be exemplified as shown in Table 2.

TABLE 2

| Transmission information | Timing | Granularity During | After |
|---|---|---|---|
| 00 | After | | TB-unit NDI |
| 01 | During | Mini-slot group | |
| 10 | | Mini-slot | |
| 11 | | Mini-slot & PRB | |

<Indication Information Configuration Method and Base Station/Terminal Operation Method>

A description is made of a method for reducing interference impact information transmission overhead (indication overhead) by simultaneously optimizing two interference impact information transmission schemes: scheme for transmitting the interference impact information during the eMBB TTI carrying URLLC data (punctured eMBB TTI, current eMBB TTI, impacted eMBB TTI) and scheme for transmitting the interference impact information during the eMBB TTI carrying a retransmission signal (HARQ retransmission eMBB TTI, after current eMBB TTI, retransmission eMBB TTI). The interference impact information being transmitted during the eMBB TTI carrying URLLC data is referred to as a first interference impact information, and the interference impact information being transmitted during the eMBB TTI carrying a retransmission signal is referred to as a second interference impact information.

A description is made of the first interference impact information in a punctured eMBB TTI (in consideration of the second interference impact information after current eMBB TTI). A description is made of the information to be fed back to the base station 320 in a situation of NACK after the terminal performs decoding based on the first interference impact information. A description is made of the second interference impact information being transmitted by the base station 320 after current eMBB TTI (in consideration of the first interference information during the punctured eMBB TTI).

Figure 4:
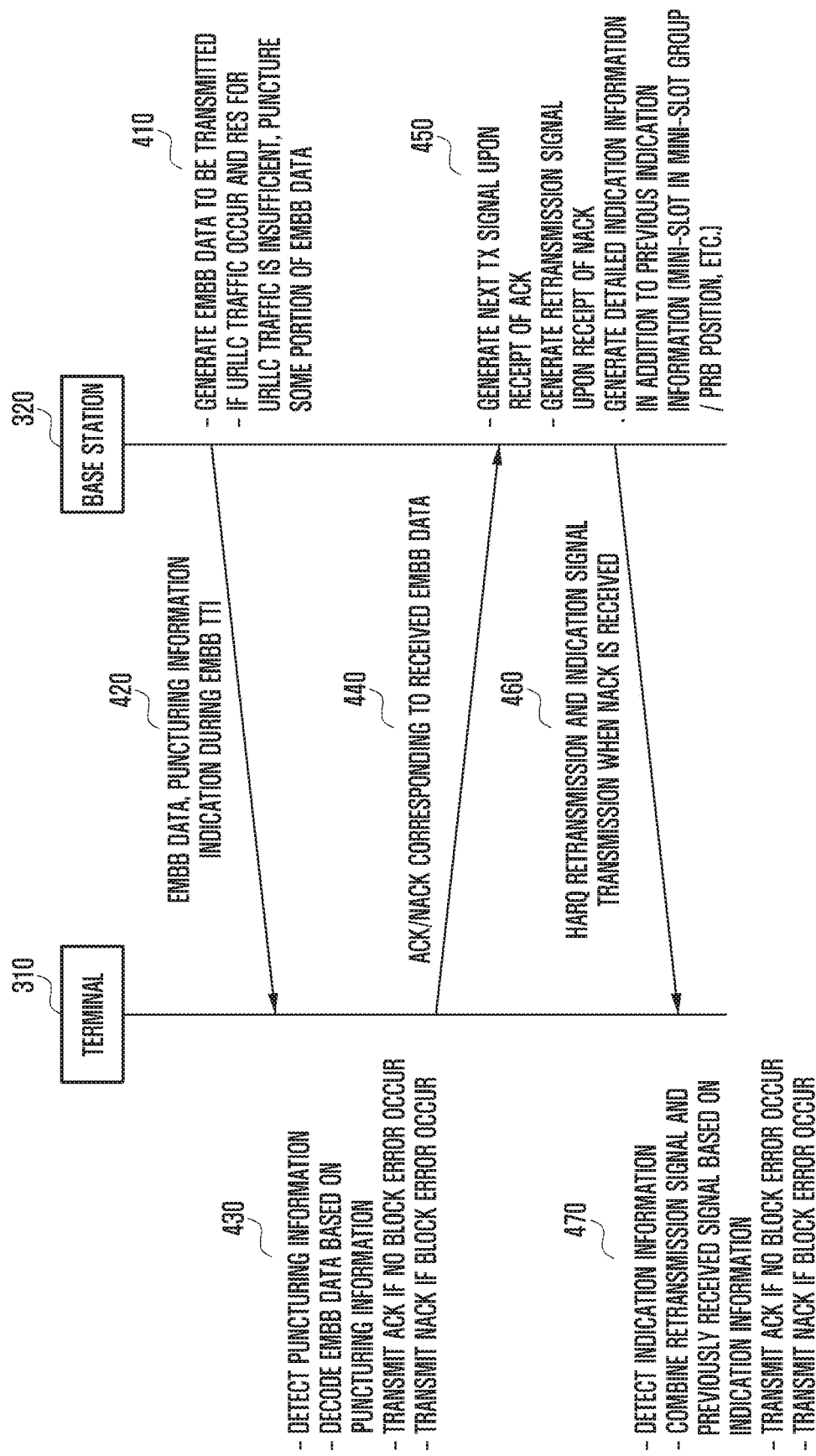
FIG. 4 is a signal flow diagram illustrating an indication information configuration and transmission method according to an embodiment of the disclosure.
Figure 5:
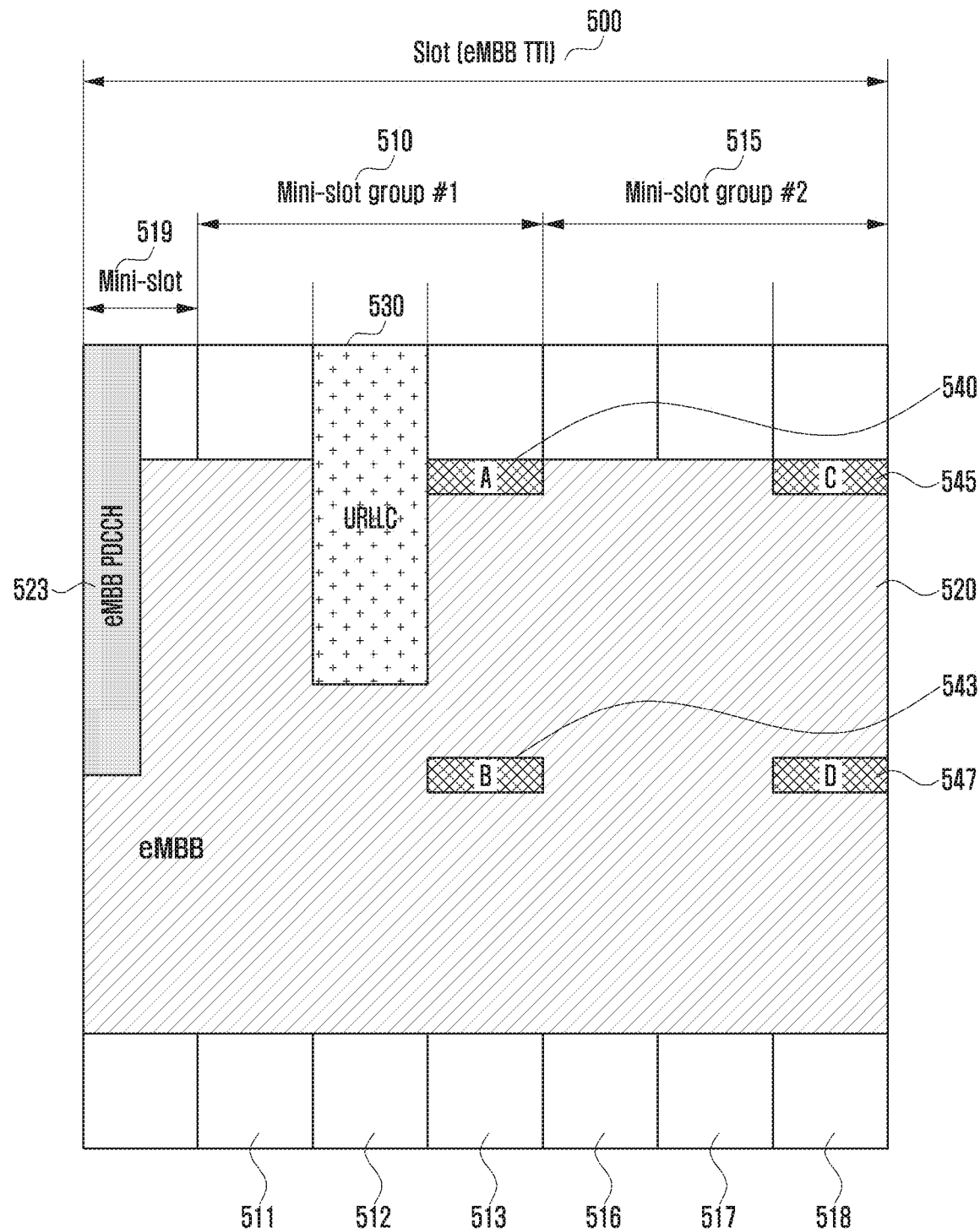
FIG. 5 is a diagram illustrating a method for transmitting first interference impact information for the case where the eMBB and URLLC services coexist according to an embodiment of the disclosure.

FIG. 4 is a signal flow diagram illustrating an indication information configuration and transmission method according to an embodiment of the disclosure, FIG. 5 is a diagram illustrating a method for transmitting first interference impact information for the case where the eMBB and URLLC services coexist according to an embodiment of the disclosure, and FIG. 6 is a diagram illustrating a method for transmitting second interference impact information for the case where the eMBB and URLLC services coexist according to an embodiment of the disclosure.

Referring to FIGS. 4 to 6, the base station 320 may generate eMBB data 520 for transmitting at operation 410. It may also be possible to generate URLLC data (or URLLC traffic) 530. If the resources (resource elements (REs)) for transmitting the URLLC data 530 are insufficient, the base station 320 may puncture a portion of the eMBB data region 520.

At operation 420, the base station 320 may transmit eMBB data 520 to the terminal 310. A portion of the eMBB data is punctured and replaced by the URLLC data 530. The base station 320 may transmit the first interference impact information 540, 543, 545, and 547 during the eMBB TTI 500 carrying the URLLC data 530. The eMBB TTI 500 may include an eMBB control channel (eMBB physical downlink control channel (PDCCH)) 523 for use in transmitting eMBB data 520, the eMBB control channel being arranged in a first mini-slot 519. Although FIG. 5 depicts that the eMBB PDCCH 523 occupies a portion of the first mini-slot 519, it may also be possible to fill the whole space of the first mini slot 519 with eMBB PDCCH.

During the eMBB TTI 500 carrying the URLLC data 530, coarse URLLC resource allocation information may be transmitted. The first interference impact information 540, 543, and 545, and 547 may include the coarse information on the resources allocated for the URLLC data 530.

For example, the resource allocation information for the URLLC data 530 may be transmitted to the terminal 310 in unit of mini-slot group or PRB group.

At operation 430, the terminal 310 may detect the first interference impact information 540, 543, 545, and 547 and decode the eMBB data 520 based on the first interference impact information 540, 543, 545, and 547. The terminal 310 may perform blind detection based on the coarse interference impact information to acquire fine resource allocation information for the URLLC data 530. The terminal 310 may also decode the eMBB data 520 based on the resource allocation information for the URLLC data 530. The terminal 310 may perform decoding on the URLLC data 520 with the exception of the resource region for the URLLC data 530. For example, the terminal 310 may set a log-likelihood ratio (LLR) for the signal received in the URLLC resource region 530 to 0 to perform decoding in the remaining eMBB data region 520.

If an error occurs in the eMBB data even though the terminal 310 has performed decoding on the eMBB data region 520 using the URLLC resource allocation information (first interference impact information) as above, the terminal 310 may request to the base station 320 for retransmission at operation 440. If an error (block error) occurs in the eMBB data region 520, the terminal 310 may transmit a NACK message to the base station 320. Otherwise, if no error (block error) occurs in the eMBB data region 520, the terminal 310 may transmit an ACK message to the base station 320.

If the base station 320 receives an ACK message from the terminal 310 at operation 440, the base station 320 may generate and transmit a next transmission signal to the terminal 310.

Otherwise, if the base station 320 receives a NACK message from the terminal 310 at operation 440, the base station 320 may generate a retransmission signal at operation 450.

During the retransmission eMBB TTI 600, the base station 320 may explicitly transmit fine information on the URLLC data 530 in addition to the indication information (i.e., first interference impact information 540, 543, 545, and 547) carried in the previous TTI (i.e., eMBB TTI 500 carrying the URLLC data). The second interference impact information may include fine resource allocation information for the URLLC data 530. The second interference impact information may be transmitted to the terminal 310 via a PDCCH (eMBB PDCCH) 623. The second interference impact information may be included in a DCI of the PDCCH 623. According to an embodiment of the disclosure, the second interference impact information may be transmitted through predetermined regions 640, 643, 645, and 647 of the eMBB data channel 620.

In this case, the base station 320 may assume that the terminal 310 has receive the first interference impact information 540, 543, 545, and 547 transmitted during the eMBB TTI 500 carrying the URLLC data erroneously.

In order to accomplish this, it may be necessary to design a method for transmitting the first interference impact information 540, 543, 545, and 547 with a high reliability during the eMBB TTI 500 carrying URLLC data.

For example, it may be considered to apply a low code rate (e.g., repetitive transmission) or perform transmission with a long sequence.

Also, there is a need of a transmission scheme for overcoming the fading channel problem. For this purpose, it may be necessary to use a transmission scheme capable of achieving a diversity effect.

According to an embodiment of the disclosure, the second interference impact information being transmitted during the retransmission eMBB TTI 600 may indicate the resource allocation information for the URLLC data 530 in a mini-slot group of the eMBB TTI 550 carrying the URLLC data by mini-slot position and/or PRBs positions. In this way, it may be possible to reduce interference impact information transmission overhead (indication overhead).

If a NACK message is received at operation 440, the base station 320 may generate second interference impact information at operation 450 and transmit a retransmission signal including the second interference impact information to the terminal 310 at operation 460.

At operation 470, the terminal 310 may detect the second interference impact information and combine the retransmission signal and the previously received signal based on the second interference impact information. The terminal 310 may combine the eMBB data, with the exception of the URLLC data 530, received during the eMBB data region 520 and the retransmitted eMBB data 620 based on the resource allocation information contained in the URLLC data 530 indicated by the second interference impact information. For example, the terminal 310 may set the LLR for the signal received in the URLLC resource region 530 to 0 and combine the remaining eMBB data region 520 and the retransmitted eMBB data 620.

If an error block is detected even after combining the data, the terminal 310 may transmit an NACK message to the base station 320. Otherwise, if no error block is detected after combining the data, the terminal 310 may transmit an ACK message to the base station 320.

As described above, the first interference impact information 540, 543, 545, and 547 being transmitted at operation 420 may include coarse resource allocation information for the URLLC data 530.

For example, the first interference impact information may include 4 indication information 540, 543, 545, and 547. The first interference impact information may include the first indication information 540 mapped to region A of the first mini-slot group 510, the second indication information 543 mapped to region B of the first mini-slot group 510, the third indication information 545 mapped to region C of the second mini-slot group 515, and the fourth indication information 547 mapped to region D of the second mini-slot group 515. The regions A and B may be spaced at an interval of a predetermined number of resource blocks (RBs), and the regions C and D may also be spaced at an interval of a predetermined number of RBs. For example, the regions A and B may be spaced at the interval of 16 RBs.

Although it is depicted that the first indication information 540 and the second indication information 543 are mapped to the third mini-slot 513 among the second to fourth mini-slots 511, 512, and 513 composing the first mini-slot group 510, the configuration is not limited thereto. For example, it may also be possible to map the first indication information 540 and the second indication information 543 to the second mini-slot 511 with the exception of the third mini-slot 512 to which the URLLC data 530 is mapped. It may also be possible to map the first indication information 540 to the second mini-slot 511 and the second indication information 543 to the fourth mini-slot 513. Likewise, although it is depicted that the third indication information 545 and the fourth indication information 547 are mapped to the seventh mini-slot 518 among the fifth to seventh mini-slots 516, 517, and 518 composing the second mini-slot group 515, the configuration is not limited thereto.

The first to fourth indication information 540, 543, 545, and 547 may include the information indicating whether any URLLC data 530 are mapped to the first and second mini-slot groups 510 and 515, respectively. The indication information 540, 543, 545, and 547 may also include the information indicating whether the URLLC data 530 is transmitted between the indication information 540, 543, 545, and 547 and next indication information 540, 543, 545, and 547. Each of the indication information 540, 543, 545, and 547 may indicate whether there is URLLC data 530 in a predetermined region.

For example, the first indication information 540 may indicate whether there is URLLC data 530 in the first mini-slot group 510. The first indication information 540 may also indicate whether there is URLLC data 530 in a first region pre-configured in the first mini-slot group 510, e.g., between the start RB of the eMBB data region 520 and the start RB of the reign B to which the second indication information 543 is mapped.

Likewise, the second indication information 543 may indicate whether there is URLLC data 530 in the first mini-slot group 510. The second indication information 543 may indicate whether there is URLLC data 530 in a second region pre-configured in the first mini-slot group 510, e.g., between the start RB of region B and the end RB of the eMBB data region 520.

The third indication information 545 may indicate where there is URLLC data 530 in the second mini-slot group 515 and whether there is URLLC data 530 in a third region pre-configured in the second mini-slot group 515, e.g., between the start RB of the eMBB data region 510 and the start RB of region D to which the fourth indication information 547 is mapped. The fourth indication information 547 may indicate whether there is URLLC data 530 in the second mini-slot group 515 and whether there is URLLC data 530 in a fourth region pre-configured in the second mini-slot group 515, e.g., between the start RB of region D and the end RB of the eMBB data region 520.

As shown in FIG. 5, the URLLC data 530 may be mapped between the start RB of the eMBB data region 520 and the start RB of region B to which the second indication information 543 is mapped in the third mini-slot 512 of the first mini-slot group 510.

In this case, the first indication information 540 mapped to the region A may include the information indicating that the URLLC data 530 is transmitted during the first mini-slot group 510 and there is the URLLC data 530 in the first region (i.e., between the start RB of the eMBB data region 520 and the start RB of the region B to which the second indication information 543 is mapped). The first indication information 540 may be a sequence transmission using 4 REs. For example, the first indication information 540 may be identical with "1 1 −1 −1."

The second indication information 543 mapped to the region B may include the information indicating that the URLLC 530 is transmitted during the first mini-slot group 510 and there is no URLLC data in the second region (i.e., between the start RB of the region B and the end RB of the eMBB data region 520). The second indication information 543 may be a sequence transmission using 4 REs. For example, the second indication information 543 may be identical with "1 −1 1 −1."

The third indication information 545 mapped to the region C may include the information indicating that the URLLC 530 is not transmitted during the second mini-slot group 515. The third indication information 545 may also include the information indicating that there is no URLLC data in the third region (i.e., between the start RB of the eMBB data region 520 and the start RB of the region D to which the fourth indication information 547 is mapped. The third indication information 545 may be a sequence transmission using 4 REs. For example, the third indication information 545 may be identical with "1 1 1 1."

The fourth indication information 547 mapped to the region D may include the information indicating that the URLLC data 530 is not transmitted during the second mini-slot group 515. The fourth indication information 547 may also include the information indicating that there is no URLLC data in the fourth region (i.e., between the start RB of the region D and the end RB of the eMBB data region 520. Here, the fourth indication information 547 may be a sequence transmission using 4 REs. For example, the fourth indication information 547 may be identical with "1 1 1 1."

The terminal 310 may perform the operations as follows at operation 430 based on the first interference impact information 540, 543, 545, and 547 received at operation 420.

First, the terminal 310 may detect the first interference impact information 540, 543, 545, and 547 and determine the presence/absence of the URLLC data and the resource region for the URLLC data 530.

At this time, it may be possible to apply sequence correlation.

The terminal 310 may detect a mini-slot group and PRB group carrying the URLLC data 530.

For example, the terminal 310 may determine whether there is URLLC data 530 during the first mini-slot group 510 or the second mini-slot group 515 (mini-slot group detection) and coarsely detect a region carrying the URLLC data 530 among the first to fourth regions (PRB group detection) based on the first to fourth indication information 540, 543, 545, and 547. In this embodiment of FIG. 5, the terminal 310 may check that there is the URLLC data 530 during the first mini-slot group 510 and there URLLC data 530 is mapped in the first region based on the first and second indication information 540 and 543. The terminal 310 may also check that there is no URLLC data 530 during the second mini-slot group 515 based on the third and fourth indication information 545 and 547.

According to an embodiment of the disclosure, the terminal 310 may perform blind detection during the detected mini-slot group and in a region corresponding to the detected PRB group to locate detailed position of the URLLC data 530.

The terminal 310 may check that the URLLC data 530 is transmitted during the first mini-slot group 510 at a coarse position of the first region, i.e., between the start RB of the eMBB data region 520 and the start RB of the region B to which the second indication information 543 is mapped, based on the first interference impact information. However, it is impossible to locate the mini-slot carrying the URLLC data 530 among the first to fourth mini-slots 510, 511, 512, and 513 using only the first interference impact information. It is also impossible to locate accurately the RB to which the URLLC data 530 is mapped based on only the first interference impact information.

In this case, the terminal 310 may perform blind detection to locate accurately the mini-slot carrying the URLLC data 530 among the second to fourth mini-slots 511, 512, and 513 and the RB to which the URLLC data 530 is mapped.

Afterward, the terminal 310 may set the LLR of the signal received in the URLLC resource region 530 to 0 and decode the eMBB data 520.

The terminal 310 may determine ACK/NACK depending on whether decoded data has an error, and then transmit the ACK/NACK information as feedback to the base station 320 at operation 440.

The base station 320 may perform the operations of operations 450 and 460 according to the ACK/NACK feedback received from the terminal 310 at operation 440.

If the base station 320 receives an ACK message from the terminal 310 at operation 440, the base station 320 may generate and transmit the next signal (e.g., new TB or CB) to the terminal 310 at operation 450.

Otherwise, if the base station 320 receives a NACK message from the terminal 310 at operation 440, the base station 320 may generate an HARQ retransmission signal and the second interference impact information to be transmitted through the PDCCH 623. The second interference impact information may include detailed resource allocation information for the URLLC data 530. For example, the second interference impact information may include the information on the mini-slot carrying the URLLC data 530 and RB to which the URLLC data 530 is mapped.

In the above embodiment, in order to indicate that the URLLC data 530 exists in the first mini-slot group 510 but URLLC data 530 does not exist in the second mini-slot group 515, the base station 320 may transmit the second interference impact information having a bitwidth of three bits set to "010." The individual bits may correspond to the respective mini-slots 511, 512, and 513 composing the mini-slot group 510 carrying the URLLC data 530 and indicate presence/absence of the URLLC data 530 in the corresponding mini-slots (e.g., 0 for absence and 1 for presence). "010" may indicate that the URLLC data 530 exists in the third mini-slot 512 but does not exist in the second and fourth mini-slots 511 and 513. According to an embodiment of the disclosure, if each of the mini-slot groups 510 and 515 consists of two mini-slots, the second interference impact information may have a bitwidth of 2 bits; if a mini-slot group consists of 4 or more mini-slots, the second interference impact information may have a bitwidth corresponding to the number of the mini-slots constituting one mini-slot group. The same principle is applied in the descriptions made hereinafter.

In the above embodiment, in order to indicate that the URLLC data 530 exists in the first mini-slot group 510 but does not exist in the second mini-slot group 515 and the URLLC data 530 is mapped to the first region (i.e., between the region A 540 and the region B 543) but is not mapped to the second region (i.e., below region B 543) in the frequency domain during the first mini-slot group carrying the URLLC data, the base station 320 may transmit the second interference impact information having a bitwidth of 7 bits set to "010 1110." Here, the first three bits set to "010" may correspond to the respective mini-slots 511, 512, and 513 composing the mini-slot group 510 and indicate presence/absence of the URLLC data 530 in the corresponding mini-slots (e.g., 0 for absence and 1 for presence). The last four bits set to "1110" may correspond to 4 frequency resource groups obtained by dividing the first region (i.e., between region A 540 and region B 543) indicate presence/absence of the URLLC data 530 in the respective frequency resource groups (e.g., 0 for absence and 1 for presence). In reference to FIGS. 5 and 6, it is shown that the URLLC data 530 is mapped to the third mini-slot 512 of the first mini-slot group 510 and RB1 to RB12 among 16 RBs composing of the first region (i.e., between the start RB of the eMBB data region 520 and the start RB of the region B 543 to which the second indication information is mapped).

Unlike the description made with reference to FIGS. 5 and 6, the second interference impact information may be configured to indicate that the URLLC data 530 does not exist in the first mini-slot group 510 but the URLLC data 530 exists in the second mini-slot group 515.

A description is made of the second interference impact information in the case where the URLLC data 530 does not exist in both the first and second mini-slot groups 510 and 515 unlike the description made with reference to FIGS. 5 and 6. For example, if the first interference impact information indicates that the URLLC data 530 does not exist in the first and second mini-slot groups 510 and 515, the base station 320 may not transmit the second interference impact information. It may also be possible for the base station 320 to transmit the second interference impact information with the bitwidth of 2 bits set to "00." The individual bits may indicate whether the URLLC data 530 does not exist in the respective mini-slot groups 510 and 515.

A description is made of the second interference impact information in the case where the URLLC data 530 exists in both the first and second mini-slot groups 510 and 515 unlike the description made with reference to FIGS. 5 and 6. For example, if the first interference impact information indicates that the URLLC data 530 exists in the first and second mini-slot groups 510 and 515 composed of 3 mini-slots each, the base station 320 may transmit the second interference impact information with a bitwidth of 6 bits. The individual bits may indicate whether the each mini-slot included in the mini-slot groups 510 and 515 carry the URLLC data 530 respectively. It may also be possible for the base station 320 to transmit the second interference impact information with a bitwidth of 10 bits. In this case, the first to sixth bits may indicate whether the URLLC data 530 is mapped to the individual mini-slots composing the mini-slot groups 510 and 515, and the seventh to tenth bits may indicate whether the URLLC data 530 is mapped to the 4 individual frequency resource groups obtained by dividing the frequency resources.

Although the description is directed to a situation where the second interference impact information has a different bitwidth depending on the situation of existence of URLLC data 530 in the above embodiment, the disclosure is applicable to the situation where the bitwidth is fixed. For example, it may be possible to transmit the second interference impact information with a bitwidth of 7 bits, which are set as described above for the case where the URLLC data 530 exists in one of the first and second mini-slot groups 510 and 515 and which are all set to "0" for the case where the URLLC data 530 does not exist in both the first and second mini-slot groups 510 and 515. Further, when the URLLC data 530 is exists in both the first mini slot group 510 and the second mini slot group 515, it may also be possible to grouping three mini slot group including two mini slots and indicates whether the URLLC data 530 exists in the each mini slot group using 3 bits, and divide frequency resources to 4 groups and indicates whether the URLLC data 530 is exists in the each group using the remaining 4 bits.

The terminal 310 may perform the operation as follows at operation 470 based on the second interference impact information received at operation 460.

The terminal 310 may acquire the second interference impact information from the PDCCH 623. The terminal 310 may identify the position of the URLLC data 530 based on the previously received first interference impact information and the currently received second interference impact information.

For example, the terminal 310 may identify the presence of the URLLC data 530 in the first region of the first mini-slot group 510 based on the first interference impact information. The terminal 310 may also identify that the URLLC data 530 is mapped to RB 1 to RB 12 of the first region of the second mini-slot 512 (i.e., third mini-slot) of the mini-slot groups indicated by the first interference impact information based on the second interference impact information.

The terminal 310 may set to LLR of the signal received in the URLLC resource region 530 to 0, combine the received signal with a retransmission signal, and perform decoding on the combined signal. The terminal 310 may determine ACK or NACK according to the decoding results and then transmit ACK/NAC feedback to the base station 320.

Second Embodiment

Figure 7:
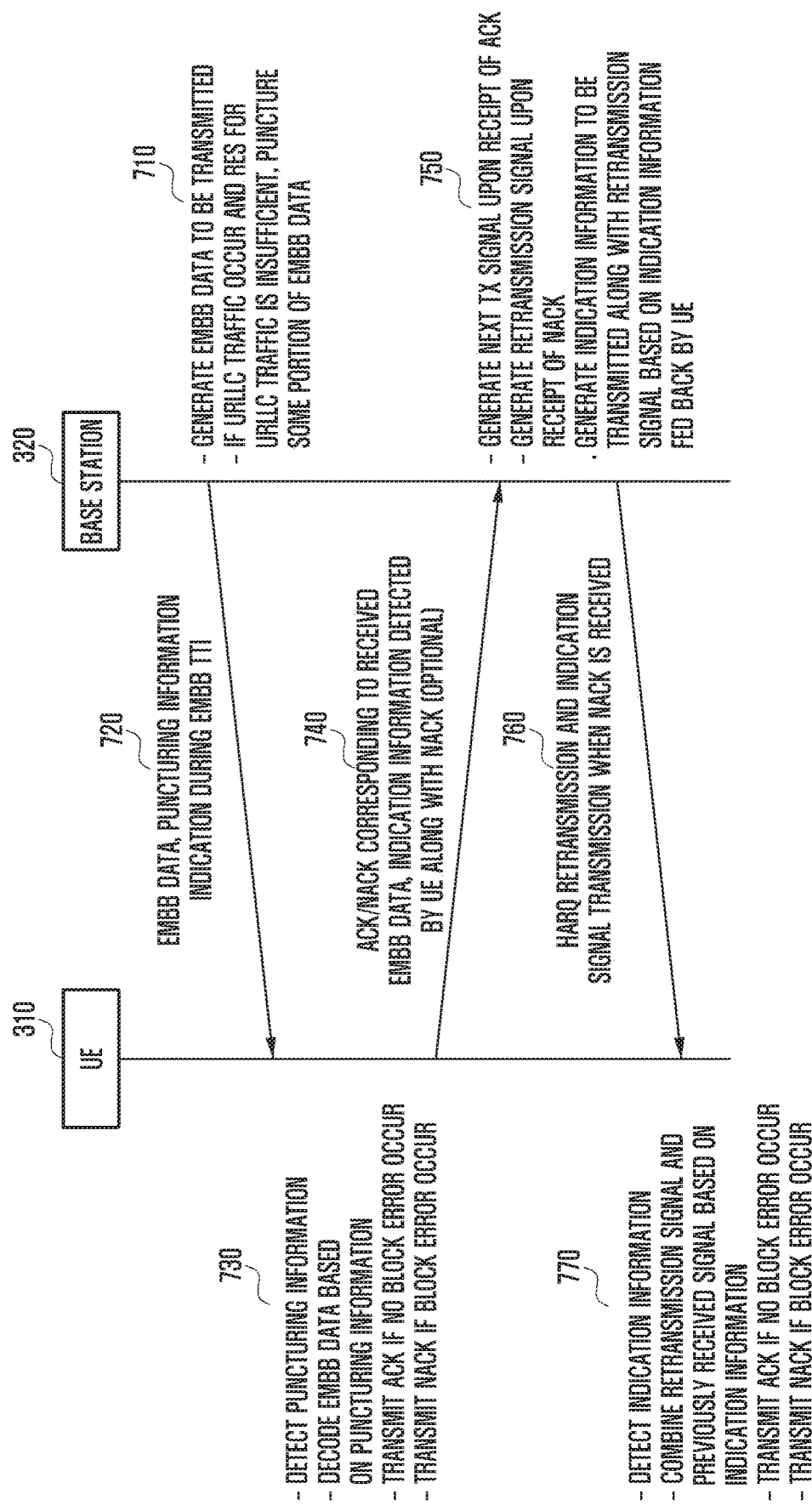
FIG. 7 is a signal flow diagram illustrating an indication information configuration and transmission method according to an embodiment of the disclosure.
Figure 8:
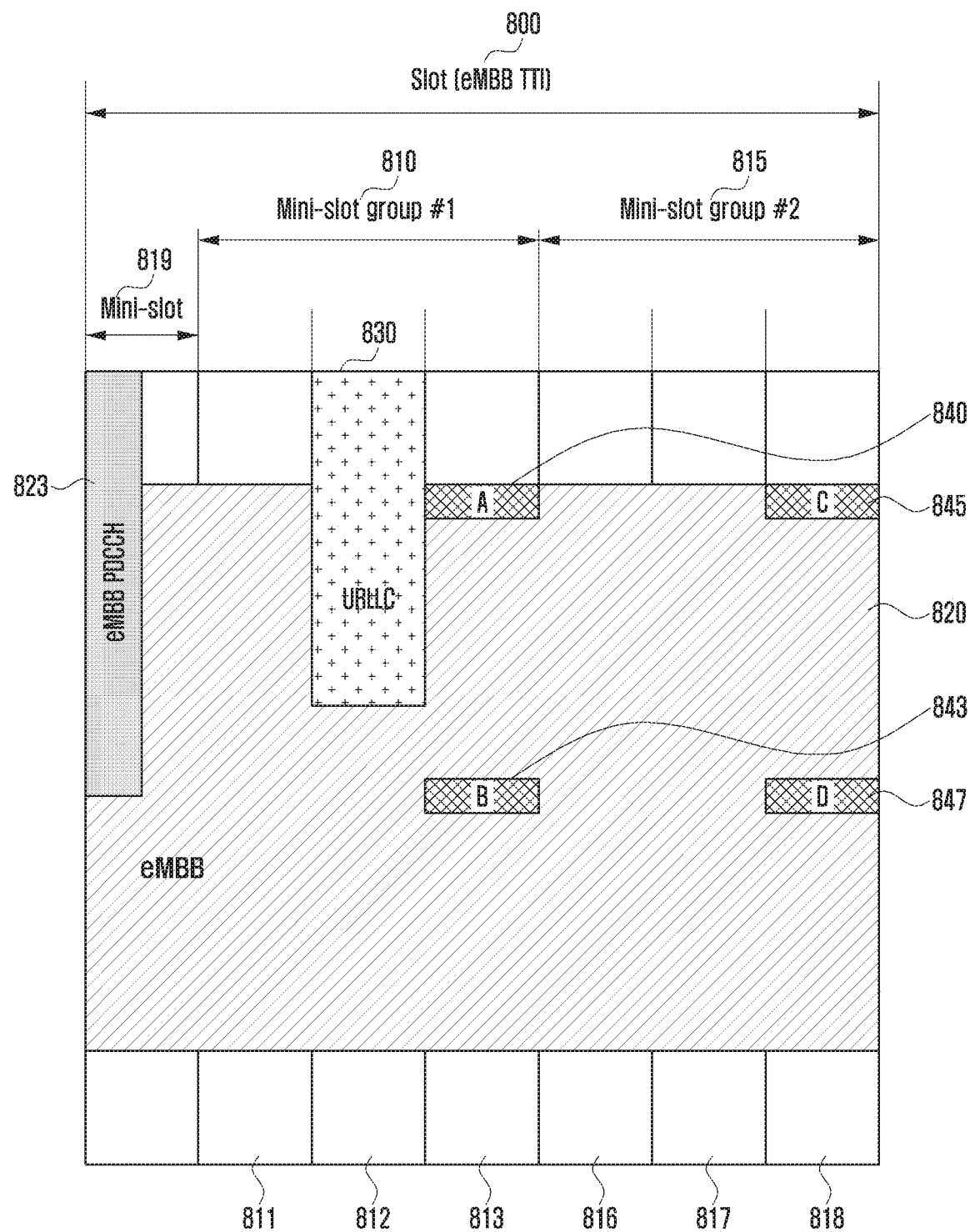
FIG. 8 is a diagram illustrating a method for transmitting first interference impact information for the case where the eMBB and URLLC services coexist according to an embodiment of the disclosure.
Figure 9:
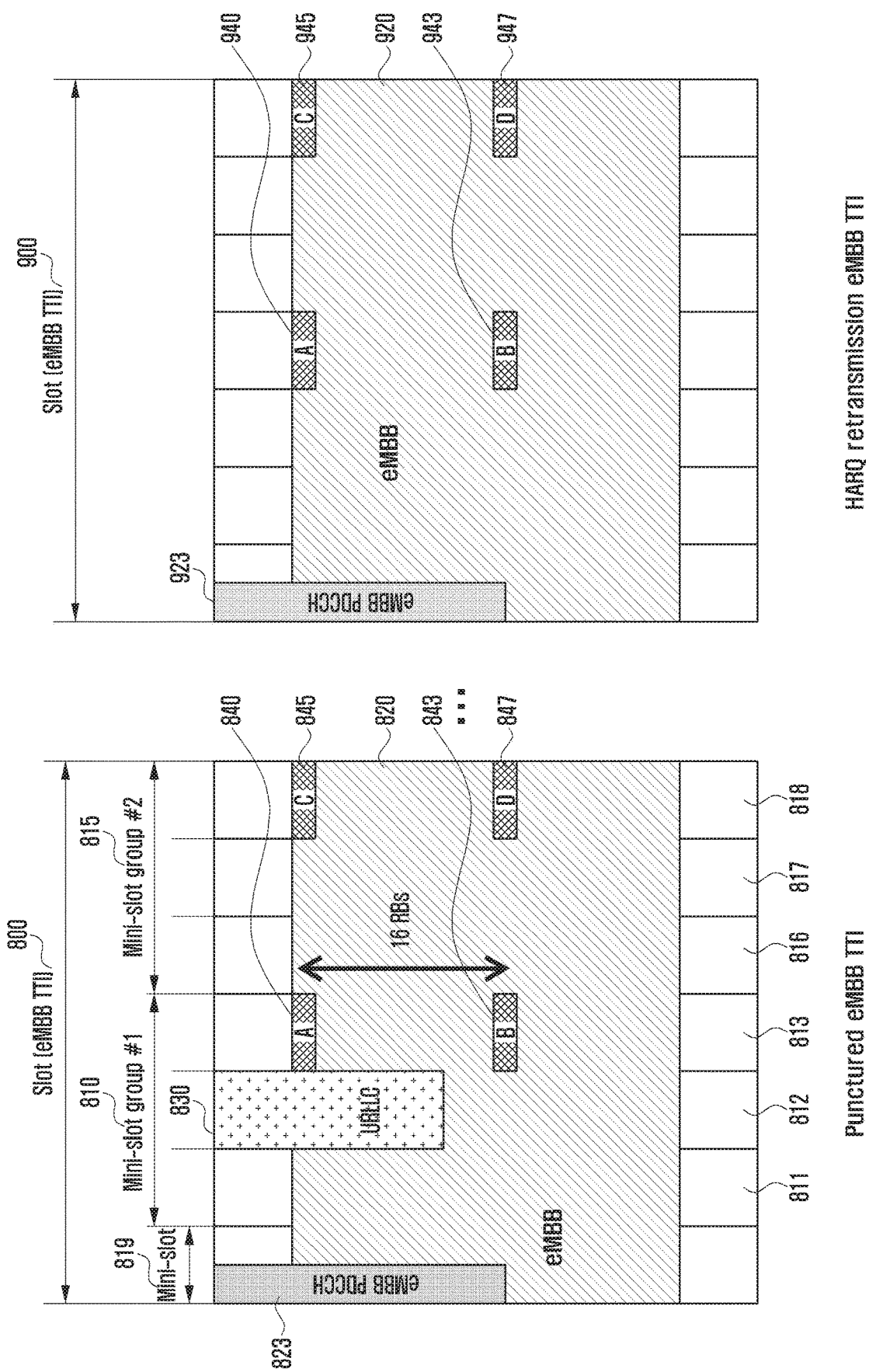
FIG. 9 is a diagram illustrating a method for transmitting second interference impact information for the case where the eMBB and URLLC services coexist according to another embodiment of the disclosure.

FIG. 7 is a signal flow diagram illustrating an indication information configuration and transmission method according to another embodiment of the disclosure, FIG. 8 is a diagram illustrating a method for transmitting first interference impact information for the case where the eMBB and URLLC services coexist according to another embodiment of the disclosure, and FIG. 9 is a diagram illustrating a method for transmitting second interference impact information for the case where the eMBB and URLLC services coexist according to another embodiment of the disclosure.

Referring to FIGS. 7 to 9, the base station 320 may generate eMBB data 820 at operation 710. It may also be possible to generate URLLC data (or URLLC traffic) 830. If the resources (REs) for transmitting the URLLC data 830 are insufficient, the base station 320 may puncture a portion of the eMBB data in the eMBB data region 820.

At operation 720, the base station 320 may transmit eMBB data 820 to the terminal 310. A portion of the eMBB data 820 is punctured and replaced by the URLLC data 830. The base station 320 may transmit the first interference impact information 840, 843, 845, and 847 during the eMBB TTI 800 carrying the URLLC data 830. The eMBB TTI 800 may include an eMBB control channel (eMBB PDCCH) 823 for use in transmitting eMBB data 820, the eMBB control channel being arranged in a first mini-slot 819. Although FIG. 8 depicts that the eMBB PDCCH 823 occupies a portion of the first mini-slot 819, it may also be possible to fill the whole space of the first mini slot 819 with eMBB PDCCH.

During the eMBB TTI 800 carrying the URLLC data 830, coarse URLLC resource allocation information may be transmitted. The first interference impact information 840, 843, and 845, and 847 may include the coarse information on the resources allocated for the URLLC data 830.

For example, the resource allocation information for the URLLC data 830 may be transmitted to the terminal 310 in unit of mini-slot group or PRB group.

At operation 730, the terminal 310 may detect the first interference impact information 840, 843, 845, and 847 and decodes the eMBB data 820 based on the first interference impact information 840, 843, 845, and 847. The terminal 310 may perform blind detection based on the coarse interference impact information to acquire fine resource allocation information for the URLLC data 830. The terminal 310 may also decode the eMBB data 820 based on the resource allocation information for the URLLC data 830. The terminal 310 may perform decoding on the URLLC data 820 with the exception of the resource region for the URLLC data 830. For example, the terminal 310 may set a LLR for the signal received in the URLLC resource region 830 to 0 to perform decoding in the remaining eMBB data region 820.

If an error occurs in the eMBB data 820 even though the terminal 310 has performed decoding on the eMBB data region 820 using the URLLC resource allocation (first interference impact information as above, the terminal 310 may request the base station 320 for retransmission at operation 740. If an error (block error) occurs in the eMBB data region 820, the terminal 310 may transmit a NACK message to the base station 320. Otherwise, if no error (block error) occurs in the eMBB data region 820, the terminal 310 may transmit an ACK message to the base station 320.

At this time, the terminal 310 may transmit to the base station 320 the first interference impact information (whole or part) along with the NACK.

The base station 320 may determine whether the terminal 310 has detected the first interference impact information without error based on the feedback information corresponding to the first interference impact information received from the terminal 310.

If the base station 320 receives an ACK message from the terminal 310 at operation 740, the base station 320 may generate and transmit a next transmission signal to the terminal 310 at operation 750.

Otherwise, if the base station 320 receives a NACK message from the terminal 310 at operation 740, the base station 320 may generate a retransmission signal at operation 750. The base station 320 may generate the second interference impact information to be transmitted along with the retransmission signal based on the feedback information corresponding to the first interference impact information received from the terminal 310.

If an error has occurred in the first interference impact information detected by the terminal 310, the base station 320 may transmit the second interference impact information that is more detailed than the first interference impact information in performing HARQ retransmission.

For example, the base station 320 may transmit to the terminal 310 the second interference impact information including the index of the mini-slot 812 having a punctured portion among all mini-slots 811, 812, 813, 816, 817, and 818 and the indices of the punctured PRBs among all PRBs.

If no error has occurred in the first interference impact information detected by the terminal 310, the base station 320 may not transmit redundant information on the punctured eMBB resources in performing HARQ retransmission.

For example, if the initial transmission (i.e., first interference impact information) carries full information on the resource allocation for URLLC data 830, no interference impact information may be included in retransmission.

If the initial transmission (i.e., first interference impact information) carries information on only the mini-slot group having the URLLC data 830 rather than full resource allocation information for the URLLC data 830, an index of the mini-slot in the corresponding mini-slot group 810 is included in retransmission. Here, the second interference impact information may include the information on the mini-slot and OFDM symbols to which the URLLC data 830 is mapped.

If the initial transmission (i.e., the first interference impact information) carries the information on the PRB group in which the URLLC data 830 exists rather than full resource allocation information for the URLLC data 830, the indices of the PRBs to which the URLLC data 830 is mapped in the corresponding PRB group are included in retransmission.

The second interference impact information may be transmitted to the terminal 310 through the PDCCH (eMBB PDCCH) 923. The second interference impact information may be transmitted by means of the DCI of the PDCCH 923. According to an embodiment of the disclosure, the second interference impact information may be mapped to predetermined regions 940, 943, 945, and 947 in the eMBB data channel 920.

If the base station 320 receives a NACK message at operation 740, the base station 320 may transmit to the terminal 310 a retransmission signal including the second interference impact information generated at operation 750.

At operation 770, the terminal 310 may detect the second interference impact information and combine the retransmission signal and the previously received signal based on the second interference impact information. The terminal 310 may combine the eMBB data 720 transmitted in the eMBB data region 820 with the exception of the URLLC data 830 and the retransmitted eMBB data 920 based on the resource allocation information for the URLLC data 830 in the second interference impact information. For example, the terminal 310 may set the LLR for the signal received in the URLLC resource region 830 to 0 and combine the remaining eMBB data region 820 and the retransmitted eMBB data 920.

If a block error is detected even after combining the data, the terminal 310 may transmit an NACK message to the base station 320. Otherwise, if no error block is detected after combining the data, the terminal 310 may transmit an ACK message to the base station 320.

As described above, the first interference impact information 840, 843, 845, and 847 being transmitted at operation 720 may include coarse resource allocation information for the URLLC data 830.

For example, the first interference impact information may include 4 indication information 840, 843, 845, and 847. The first interference impact information may include the first indication information 840 mapped to region A of the first mini-slot group 810, the second indication information 843 mapped to region B of the first mini-slot group 810, the third indication information 845 mapped to region C of the second mini-slot group 815, and the fourth indication information 847 mapped to region D of the second mini-slot group 815. The regions A and B may be spaced at an interval of a predetermined number of RBs, and the regions C and D may also be spaced at an interval of a predetermined number of RBs. For example, the regions A and B may be spaced at the interval of 16 RBs.

Although it is depicted that the first indication information 840 and the second indication information 843 are mapped to the third mini-slot 813 among the second to fourth mini-slots 811, 812, and 813 composing the first mini-slot group 810, the configuration is not limited thereto. For example, it may also be possible to map the first indication information 840 and the second indication information 843 to the second mini-slot 811 with the exception of the third mini-slot 812 to which the URLLC data 830 is mapped. It may also be possible to map the first indication information 840 to the second mini-slot 811 and the second indication information 843 to the fourth mini-slot 813. Likewise, although it is depicted that the third indication information 845 and the fourth indication information 847 are mapped to the seventh mini-slot 818 among the fifth to seventh mini-slots 816, 817 and 818 composing the second mini-slot group 815, the configuration is not limited thereto.

The first to fourth indication information 840, 843, 845, and 847 may include the information indicating whether any URLLC data 830 are mapped to the first and second mini-slot groups 810 and 815, respectively. The indication information 840, 843, 845, and 847 may also include the information indicating whether the URLLC data 830 is transmitted continuously in the next slot. That is, each of the indication information 840, 843, 845, and 847 may indicate whether there is URLLC data 830 in a predetermined region.

For example, the first indication information 840 may indicate whether there is URLLC data 830 in the first mini-slot group 810. The first indication information 840 may also indicate whether there is URLLC data 830 in a first region pre-configured in the first mini-slot group 810, e.g., between the start RB of the eMBB data region 820 and the start RB of the reign B to which the second indication information 843 is mapped.

Likewise, the second indication information 843 may indicate whether there is URLLC data 830 in the first mini-slot group 810. The second indication information 843 may indicate whether there is URLLC data 830 in a second region pre-configured in the first mini-slot group 810, e.g., between the start RB of region B and the end RB of the eMBB data region 820.

The third indication information 845 may indicate where there is URLLC data 830 in the second mini-slot group 815 and whether there is URLLC data 830 in a third region pre-configured in the second mini-slot group 815, e.g., between the start RB of the eMBB data region 820 and the start RB of region D to which the fourth indication information 847 is mapped. The fourth indication information 847 may indicate whether there is URLLC data 830 in the second mini-slot group 815 and whether there is URLLC data 830 in a fourth region pre-configured in the second mini-slot group 815, e.g., between the start RB of region D and the end RB of the eMBB data region 820.

As shown in FIG. 8, the URLLC data 830 may be mapped between the start RB of the eMBB data region 820 and the start RB of region B to which the second indication information 843 is mapped in the third mini-slot 812 of the first mini-slot group 810.

In this case, the first indication information 840 mapped to the region A may include the information indicating that the URLLC data 830 is transmitted during the first mini-slot group 810 and there is the URLLC data 830 in the first region (i.e., between the start RB of the eMBB data region 820 and the start RB of the region B to which the second indication information 843 is mapped). The first indication information 840 may be a sequence transmission using 4 REs. For example, the first indication information 540 may be identical with "1 1 −1 −1."

The second indication information 843 mapped to the region B may include the information indicating that the URLLC 830 is transmitted during the first mini-slot group 810 and there is no URLLC data in the second region (i.e., between the start RB of the region B and the end RB of the eMBB data region 820). The second indication information 843 may be a sequence transmission using 4 REs. For example, the second indication information 843 may be identical with "1 −1 1 −1."

The third indication information 845 mapped to the region C may include the information indicating that the URLLC 830 is not transmitted during the second mini-slot group 815. The third indication information 845 may also include the information indicating that there is no URLLC data in the third region (i.e., between the start RB of the eMBB data region 820 and the start RB of the region D to which the fourth indication information 847 is mapped). The third indication information 845 may be a sequence transmission using 4 REs. For example, the third indication information 845 may be identical with "1 1 1 1."

The fourth indication information 847 mapped to the region D may include the information indicating that the URLLC data 830 is not transmitted during the second mini-slot group 815. The fourth indication information 847 may also include the information indicating that there is no URLLC data 830 in the fourth region (i.e., between the start RB of the region D and the end RB of the eMBB data region 820). The fourth indication information 847 may be a sequence transmission using 4 REs. For example, the fourth indication information 847 may be identical with "1 1 1 1."

The terminal 310 may perform the operations as follows at operation 730 based on the first interference impact information 840, 843, 845, and 847 received at operation 720.

First, the terminal 310 may detect the first interference impact information 840, 843, 845, and 847 and determine the presence/absence of the URLLC data 830 and the resource region for the URLLC data 830.

At this time, it may be possible to apply sequence correlation.

The terminal 310 may detect a mini-slot group and PRB group carrying the URLLC data 830.

For example, the terminal 310 may determine whether there is URLLC data 830 during the first mini-slot group 810 or the second mini-slot group 815 (mini-slot group detection) and coarsely detect a region carrying the URLLC data 830 among the first to fourth regions (PRB group detection) based on the first to fourth indication information 840, 843, 845, and 847. In this embodiment of FIG. 8, the terminal 310 may check that there are the URLLC data 830 during the first mini-slot group 810 and URLLC data 830 is mapped in the first region based on the first and second indication information 840 and 843. The terminal 310 may also check that there is no URLLC data 830 during the second mini-slot group 815 based on the third and fourth indication information 845 and 847.

According to an embodiment of the disclosure, the terminal 310 may perform blind detection during the detected mini-slot group and in a region corresponding to the detected PRB group to locate detailed position of the URLLC data 830.

The terminal 310 may check that the URLLC data 830 is transmitted in the first mini-slot group 810 at a coarse position of the first region, i.e., between the start RB of the eMBB data region 820 and the start RB of the region B to which the second indication information 843 is mapped, based on the first interference impact information. However, it is impossible to locate the mini-slot carrying the URLLC data among the second to fourth mini-slots 810, 811, 812, and 813 composing the first mini-slot group 810 using only the first interference impact information. It is also impossible to locate accurately the RB to which the URLLC data 830 is mapped based on only the first interference impact information.

In this case, the terminal 310 may perform blind detection to locate accurately the mini-slot carrying the URLLC data 830 among the second to fourth mini-slots 811, 812, and 813 and the RB to which the URLLC data 830 is mapped.

Afterward, the terminal 310 may set the LLR of the signal received in the URLLC resource region 830 to 0 and decode the eMBB data 820.

The terminal 310 may generate ACK/NACK information depending on whether decoded data has an error and then transmit the ACK/NACK information as feedback to the base station 320 at operation 740.

If a NACK situation occurs, the terminal 310 may store the LLR before applying the first interference impact information 840, 843, 845, and 847 to perform HARQ combining.

Then, the terminal 310 may transmit the feedback corresponding to the first interference impact information to the base station 320. At this time, the terminal 310 may include whole or part of the first interference impact information in the feedback to the base station 320.

For example, the feedback information may have a bit-width of 4 bits.

The 4-bit feedback information may be set to "1010" to indicate that the terminal 310 has detected the presence of URLLC data 830 in PRBs between the regions A and B (or between regions C and D) of the first mini-slot group 810. The 4-bit feedback information may be set to "1001" to indicate that the terminal 310 has detected the presence of URLLC data 830 in PRBs below the region B (or region D) of the first mini-slot group 810. The 4-bit feedback information may be set to "0110" to indicate that the terminal 310 has detected the presence of URLLC data 830 in PRBs between regions A and B (or between regions C and D) of the second mini-slot group 815. The 4-bit feedback information may set to "0101" to indicate that the terminal 310 has detected the presence of URLLC data 830 in PRBs below the region B (or region D) of the second mini-slot group 815. Although the description is directed to the case of using 4-bit feedback information in the above embodiment, it is obvious that the bitwidth of the feedback information is not limited to 4 bits but may be decreased or increased. For example, the feedback information may have a bitwidth of 2 bits and, in this case, the frequency domain resource information is not indicated.

In the embodiment of FIG. 8 where the URLLC data 830 exists in PRBs between the regions A and B of the first-mini-slot group 810, if the terminal 310 has detected the first interference impact information without an error, it may transmit the feedback information set to "1010" to the base station 320. If the first interference impact information detection result has an error, the terminal 310 may transmit other feedback information other than the feedback information set to "1010" to the base station 320.

The base station 320 may perform the operations as follows at operation 750 and 760 based on the ACK/NACK feedback received from the terminal 310 at operation 740.

If the base station 320 receives an ACK message from the terminal 310 at operation 740, the base station 320 may generate and transmit the next signal (e.g., new TB or CB) to the terminal 310 at operation 750.

Otherwise, if the base station 320 receives a NACK message from the terminal 310 at operation 740, the base station 320 may generate an HARQ retransmission signal. At this time, the base station 320 may generate the second interference impact information to be transmitted along with the retransmission signal based on the feedback information received at operation 740.

For the above operations, the base station 320 may determine whether the first interference impact information detection result of the terminal 310 has an error based on the feedback information. In the case of FIG. 8 where the URLLC data 830 exists in PRBs between the regions A and B of the first mini-slot group 810, if the terminal 310 transmits the feedback information set to "1010," the base station 320 may determine that the first interference impact information detection result of the terminal 310 has not error. However, if the terminal 310 transmit to the base station 320 the feedback information set to a value other than "1010," the base station 320 may determine that the first interference impact information detection result of the terminal 310 has an error.

If it is determined that the first interference impact information detection result of the terminal 310 has not error based on the feedback information from the terminal 310, the base station 320 may not transmit the information on the punctured eMBB resource (e.g., resource allocated for URLLC data) that is overlapping with the first interference impact information in performing HARQ retransmission.

The base station 320 may generate the second interference impact information to be transmitted to the terminal 310 along with the HARQ retransmission signal through the PDCCH 923. The second interference impact information may include the detailed information on the resource allocated for the URLLC data 830. For example, the second interference impact information may include the information on the mini-slot and RBs to which the URLLC data 830 is mapped. According to an embodiment of the disclosure, the second interference impact information may include the information on whether the first interference impact information detection result of the terminal 310 has an error.

As described above, the information on the resource allocated for the URLLC data 830 that is overlapping with the first interference impact information may not be included in the second interference impact information. For example, if the first interference impact information includes the information on the mini-slot group and PRB group in which the URLLC data 830 exists, the second interference information may not include the information on the mini-slot group and PRB group in which the URLLC data 830 exists. Instead, the second interference impact information may include the information on the mini-slot to which the URLLC data 820 is mapped in the corresponding mini-slot group and PRBs to which the URLLC data 830 is mapped in the corresponding PRB group. The terminal 310 may combine the first and second interference impact information to check the accurate position of the resource allocated for the URLLC data 830.

For example, the first interference impact information may indicate the first mini-slot group 810 and the first region. The second interference impact information may indicate the second mini-slot and RB 1 to RB 12. In this case, the terminal 310 may identify that the URLLC data 830 is mapped to the second mini-slot 812 of the first mini-slog group 810 (i.e., third mini-slot) and RB 1 as the start RB of the eMBB data region 820 and RB 12.

The first interference impact information may indicate the first mini-slot group 810 and the second region. The second interference impact information may indicate the second mini-slot and RB 1 to RB 12. In this case, the terminal 310 may identify that the URLLC data 830 is mapped to the second mini-slot 812 of the first mini-slot group (i.e., third mini-slot) and RB 1 as the start RB of the region B to which the second indication information 843 to RB 12.

The second interference impact information may have extra bits according to the presence of URLLC data 830 and whether the first interference impact information detection result has an error. If the first interference impact information detection result has no error in a situation where the URLLC data 830 exists in one of the first and second mini-slot groups 810 and 815 as shown in FIGS. 8 and 9, the second interference impact information may have a bitwidth of 8 bits. In this case, the first bit may indicate whether the first interference impact information detection result has an error, and the next three bits may indicate mini-slot 812 to which the URLLC data 830 is mapped in the mini-slot group 810 indicated by the first interference impact information as the mini-slot group in which the URLLC data 830 exists. The last four bits may indicate the RBs to which the URLLC data 830 is mapped in the PRB group indicated by the first interference impact information as the PRG group in which the URLLC data 830 exists. According to an embodiment of the disclosure, if the mini-slot groups 810 and 815 each are composed of 2 mini-slots, the second interference impact information may have 2 bits representing the respective mini-slots to indicate presence/absence of URLLC data 830 mapped thereto; if the mini-slot groups 810 and 815 each are composed of 4 or more mini-slots, the second interference impact information may have bits representing, and equal in number to, the respective mini-slots to indicate presence/absence of URLLC data 830 mapped thereto. The same principle is applied in the descriptions made hereinafter.

In the embodiment of FIGS. 8 and 9, the URLLC data 830 is mapped to the third mini-slot 812 of the first mini-slog group 810 (i.e., third mini-slot among total 7 mini-slots) and RB 1 to RB 12 among the 16 RBs of the first region (i.e., from the start RB of the eMBB data region 820 and the start RB of the region B to which the second indication information 843 is mapped).

In this case, the base station 320 may generate the second interference impact information indicating that the URLLC data 830 is mapped to the third mini-slot 812 of the first mini-slog group 810 (i.e., third mini-slot among total 7 mini-slots) and RB 1 to RB 12 among the 16 RBs of the first region and transmits the second interference impact information to the terminal 310.

For the above indication, the second interference impact information may be set to "0 010 1110." In this case, the first bit set to "0" may indicate that the first interference impact information detection result of the terminal 310 has no error. The next three bits set to "010" may indicate that the URLLC data 830 is mapped to the second mini-slot 812 of the mini-slot group 810 (i.e., third mini-slot among total 7 mini-slots) indicated by the first interference impact information as the mini-slot group in which the URLLC data exists. The last four bits set to "1110" may indicate that the URLLC data 830 is mapped to the RB 1 and RB 12 of the 16 RBs composing the first region. The 16 RBs may be sorted into 4 groups each having 4 RBs such that it is possible to indicate the RBs to which the URLLC data 830 is mapped with 4 bits.

If the first interference impact information detection result has an error in a situation where the URLLC data 830 exists in one of the first and second mini-slot groups 810 and 815 as shown in FIGS. 8 and 9, the second interference impact information may have a bitwidth of 15 bits. In this case, the first bit may indicate whether the first interference impact information detection result has an error, and the next six bits may indicate mini-slot 812 to which the URLLC data 830 is mapped. The last eight bits may indicate the RBs to which the URLLC data 830 is mapped in the frequency domain.

Although the description is direction to a situation where the second interference impact information has a different bitwidth depending on the situation of existence of URLLC data 830 and whether the first interference impact information detection result has an error, the disclosure is applicable to the situation where the bitwidth is fixed. For example, if the first interference impact information detection result has no error in a situation where the URLLC data 830 exists in one of the first and second mini-slot groups 810 and 815 as shown in FIGS. 8 and 9, the second interference impact information may have a bitwidth of 8 bits. If the first interference impact information detection result has an error, the second interference impact information may maintain the same bitwidth by omitting the information on the RBs to which the URLLC data 830 is mapped in the frequency domain.

A description is made of the second interference impact information in the case where the URLLC data 830 does not exist in both the first and second mini-slot groups 810 and 815 unlike the description made with reference to FIGS. 8 and 9. For example, if the first interference impact information indicates that the URLLC data 830 does not exist in the first and second mini-slot groups 810 and 815 and if the first interference impact information detection result of the terminal 310 has no error, the base station 320 may transmit to the terminal 310 the second interference impact information with a bitwidth set to "0." The bit value of the corresponding bit indicates that the first interference impact information detection result has no error.

In the above situation, the base station 320 may transmit to the second impact information with a bitwidth of 3 bits set to "000." The first bit indicates that the first interference impact information detection result has no error, and the second and third bits indicate that no URLLC data 830 exists in the corresponding mini-slot groups.

However, if the first interference impact information indicates that the URLLC data 830 does not exist in the first and second mini-slot groups 810 and 815 and if the first interference impact information detection result of the terminal 310 has an error, the base station 320 may transmit to the terminal 310 the second interference impact information with a bitwidth of 3 bits set to "100." The first bit indicates that the first interference impact information detection result has an error, and the second and third bits indicate that no URLLC data 830 exists in the corresponding mini-slot groups.

A description is made of the second interference impact information in the case where the URLLC data 830 exists in both the first and second mini-slot groups 810 and 815 unlike the description made with reference to FIGS. 8 and 9. For example, if the first interference impact information indicates that the URLLC data 830 exists in the first and second mini-slot groups 810 and 815 and if the first interference impact information detection result of the terminal 310 has no error, the base station 320 may transmit the second interference impact information with a bitwidth of 7 bits. In this case, the first bit indicates whether the first interference impact information detection result has no error, and the remaining bits represent the individual mini-slots 811, 812, 813, 816, 817, and 818 composing the mini-slot groups 810 and 815 to indicate whether the URLLC data 830 is mapped to the corresponding mini-slots 811, 812, 813, 816, 817, and 818. The base station 320 may also transmit the second interference impact information with a bitwidth of 11 bits. In this case, the first bit indicates whether the first interference impact information detection result has no error, the second to seventh bits represent the individual mini-slots 811, 812, 813, 816, 817, and 818 composing the mini-slot groups 810 and 815 to indicate whether the URLLC data 830 is mapped to the corresponding individual mini-slots 811, 812, 813, 816, 817, and 818, and the eighth to eleventh bits indicate whether the URLLC data 830 is mapped to the 4 individual frequency resource groups obtained by dividing the frequency resources.

If the first interference impact information indicates that the URLLC data 830 exists in the first and second mini-slot groups 810 and 815 and the first interference impact information detection result of the terminal 310 has an error, the base station 320 may transmit the second interference impact information with a bitwidth of 7 bits. In this case, the first bit indicates whether the first interference impact information detection result has an error, the remaining bits represent the individual mini-slots 811, 812, 813, 816, 817, and 818 composing the mini-slot groups 810 and 815 to indicate whether the URLLC data 830 is mapped to the corresponding mini-slots 811, 812, 813, 816, 817, and 818. The base station 320 may also transmit the second interference impact information with a bitwidth of 11 bits. In this case, the first bit indicates whether the first interference impact information detection result has an error, the second to seventh bits represent the individual mini-slots 811, 812, 813, 816, 817, and 818 composing the mini-slot groups 810 and 815 to indicate whether the URLLC data 830 is mapped to the corresponding individual mini-slots 811, 812, 813, 816, 817, and 818, and the eighth to eleventh bits indicate whether the URLLC data 830 is mapped to the 4 individual frequency resource groups obtained by dividing the frequency resources.

Although the description is directed to a situation where the second interference impact information has a different bitwidth depending on the situation of existence of URLLC data 830 in the above embodiment, the disclosure is applicable to the situation where the bitwidth is fixed. For example, it may be possible for the base station 320 to transmit the second interference impact information with a fixed number of bits, which set as described above for the case where the URLLC data 830 exists in one of the first and second mini-slot groups 810 and 815 and which are all set to "0" for the case where the URLLC data 830 does not exist in both the first and second mini-slot groups 810 and 815. It may also be possible to maintain the fixed bitwidth by grouping the mini-slots by 2 to indicate whether the URLLC data 830 exists in the individual mini-slot groups and adjusting the number of frequency resource groups in the case where the URLLC data 830 exists in both the first and second mini-slot groups 815.

In order to reduce the second interference impact information overhead, it may be possible to adjust the number of mini-slots per mini-slot group and the number of frequency resource groups, and part of such information may not be included in the second interference information.

The terminal 310 may perform the operation as follows at operation 770 based on the second interference impact information received at operation 760.

The terminal 310 may acquire the second interference impact information from the PDCCH 923.

The terminal 310 may determine the position of the URLLC data 830 based on the first and second interference impact information.

The terminal 310 may set the LLR for the signal received in the URLLC resource region 830 to 0, combine the received signal with a retransmission signal, and perform decoding on the combined signal. The terminal 310 may determine whether ACK or NACK according to the decoding results and then transmit ACK/NAC feedback to the base station 320.

Figure 10:
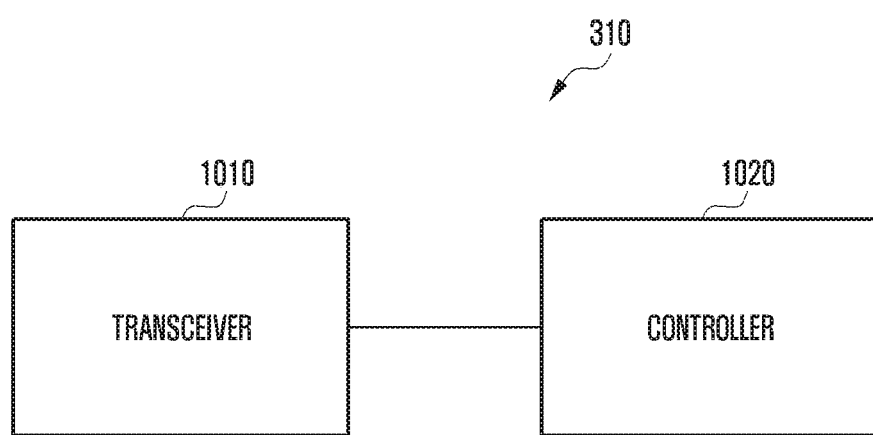
FIG. 10 is a block diagram illustrating a configuration of a terminal according to an embodiment of the disclosure.

FIG. 10 is a block diagram illustrating a configuration of a terminal according to an embodiment of the disclosure.

Referring to FIG. 10, the terminal 310 according to an embodiment of the disclosure may include a transceiver 1010 and a controller 1020 for controlling overall operation of the terminal 310. The transceiver 101 may include a transmitter and a receiver.

The transceiver 1010 may transmit and receive signals to and from other network entities.

The controller 1020 may control the terminal 310 to perform an operation of one of the above described embodiments. For example, the controller 1020 may transmit to a base station a first message including the information on the timing for the terminal to receive the interference impact information including the information on the interference caused by a second signal of a second system which uses a second TTI to a first signal of a first system which uses a first TTI and may receive a second message including the information on the timing for the base station to transmit the interference impact information, the timing being determined based on the information on the timing for the terminal to receive the interference impact information.

The controller 1020 and the transceiver 1010 may be implemented as separate devices or an integrated component in the form of a single chip. The controller 1020 and the transceiver 1010 may be electrically connected to each other.

For example, the controller 1020 may be a circuit, an application-specific circuit, or at least one processor. The operations of the terminal may be realized by situating a memory device storing the corresponding program codes in an arbitrary component of the terminal. The controller 1020 may perform the above-described operations by reading out and execute the program codes stored in the memory device by means of a processor or a central processing unit (CPU).

Figure 11:
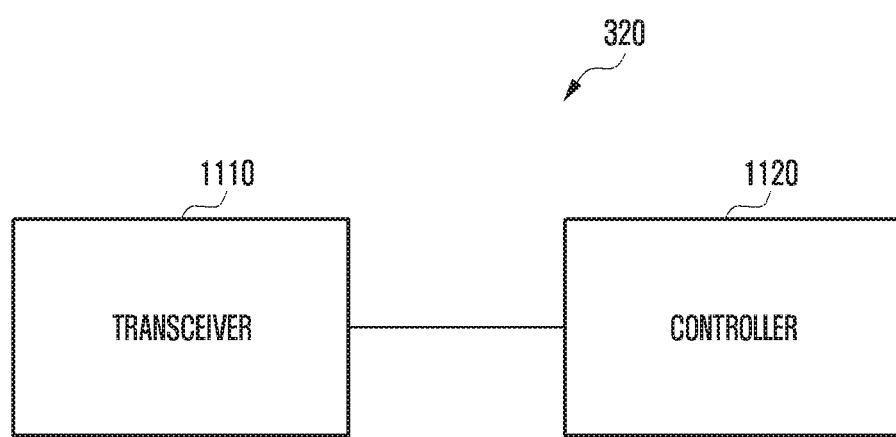
FIG. 11 is a block diagram illustrating a configuration of a base station according to an embodiment of the disclosure.

FIG. 11 is a block diagram illustrating a configuration of a base station according to an embodiment of the disclosure.

Referring to FIG. 11, the base station 320 according to an embodiment of the disclosure may include a transceiver 1110 and a controller 1120 for controlling overall operations of the base station. The transceiver 1110 may include a transmitter and a receiver.

The transceiver 1110 may transmit and receive signals to and from other network entities.

The controller 1120 may control the base station 320 to perform the operation of one of the above-described embodiments. For example, the controller 1120 may receive from a terminal a first message including the information on the timing for the terminal to receive the interference impact information including the information on the interference caused by the second signal of the second system which uses the second TTI to the first signal of the first system that uses the first TTI and may transmit to the terminal a second message including the information on the timing for the base station to transmit the interference impact information.

The controller 1120 and the transceiver 1110 may be implemented as separate devices or an integrated component in the form of a single chip. The controller 1120 and the transceiver 1110 may be electrically connected to each other.

For example, the controller 1120 may be a circuit, an application-specific circuit, or at least one processor. The operations of the base station may be realized by situating a memory device storing the corresponding program codes in an arbitrary component of the base station. The controller 1120 may perform the above-described operations by reading out and execute the program codes stored in the memory device by means of a processor or a CPU.

It should be noticed that the methods and devices illustrated in and described with reference to FIGS. 1 to 11 are not intended limit the scope of the claims to the disclosure. The disclosure should not be construed as being limited to the components, entities, or operating steps exemplified in FIGS. 1 to 11 but can be implemented without part of the components without departing the technical concept of the disclosure.

The above-described operations of the base station 320 and terminal 310 can be realized by situating a memory device storing the corresponding program codes in an arbitrary component of the base station 320 and the terminal 310. The controller 1120 of the base station 320 and the controller 1020 of the terminal 310 may perform the above-described operations by reading out and execute the program codes stored in the memory device by means of a processor or a CPU.

The various components, modules composing an entity, a base station, or a terminal may be implemented in the form of a hardware circuit such as a complementary metal oxide semiconductor-based logic circuit, firmware, software and/or a combination of hardware and firmware, and/or a software element stored in a machine-readably medium. For example, various electrical structure and methods may be executed by means of electric circuits such as transistors, logic gates, and on-demand semiconductors.

As described above, the disclosure is advantageous in terms of allocating resources for transmitting data and indication information efficiently and allowing a terminal to recognize the sources allocated per service in a wireless communication system providing heterogeneous services with different characteristics. The disclosure is advantageous in terms of allowing the low priority service which has stolen part of the resources allocated thereto for supporting a high priority service to perform modulation/demodulation efficiently so as to mitigate performance degradation.

The disclosure is advantageous in terms of improving a signal reception efficiency per service by allocating resources for transmitting data and indication information efficiently and configuring the indication information being transmitted at multiple time points to be associated with each other in in situation where heterogeneous services are provided in the wireless communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication method of a terminal, the method comprising:
    receiving, from a base station, first information for configuring the terminal to monitor an indication, the first information including granularity information associated with the indication;
    receiving, from the base station, the indication including resource information indicating a resource based on the first information, the indication indicating that no transmission is intended for the terminal in the resource; and
    identifying that no transmission is intended for the terminal in the resource based on the resource information included in the indication and the granularity information included in the first information.

2. The method of claim 1,
wherein the resource information indicates a physical resource block (PRB).

3. The method of claim 1,
wherein the first information is transmitted in a radio resource control (RRC) message.

4. The method of claim 1, wherein the identifying that no transmission is intended for the terminal in the resource comprises:
    receiving, from the base station, first data on the resource;
    transmitting, to the base station, a negative acknowledgement message for the first data;
    receiving, from the base station, downlink control information (DCI) including second information indicating whether second data being received on the resource is combinable with the first data;
    receiving, from the base station, the second data on the resource based in the DCI; and
    decoding the second data based on the second information.

5. The method of claim 4, wherein the second information indicates whether the second data being received on the resource is combinable with the received first data per a code block group (CBG).

6. A communication method of a base station, the method comprising:
    transmitting, to a terminal, first information for configuring the terminal to monitor an indication, the first information including granularity information associated with the indication;
    transmitting, to the terminal, the indication including resource information indicating a resource based on the first information, the indication indicating that no transmission is intended for the terminal in the resource; and
    identifying that no transmission is intended for the terminal in the resource based on the resource information included in the indication and the granularity information included in the first information.

7. The method of claim 6, wherein the resource information indicates a physical resource block (PRB).

8. The method of claim 6, wherein the first information is transmitted in a radio resource control (RRC) message.

9. The method of claim 6, wherein the identifying that no transmission is intended for the terminal in the resource comprises:
    transmitting, to the terminal, first data on the resource;
    receiving, from the terminal, a negative acknowledgement message for the first data;
    transmitting, to the terminal, downlink control information (DCI) including second information indicating whether second data being received on the resource is combinable with the first data; and
    transmitting, to the terminal, the second data on the resource based in the DCI.

10. The method of claim 9, wherein the second information indicates whether the second data being received on the resource is combinable with the received first data per a code block group (CBG).

11. A terminal, the terminal comprising:
    a transceiver; and
    at least one processor configured to:
        receive, from a base station, first information for configuring the terminal to monitor an indication, the first information including granularity information associated with the indication,
        receive, from the base station, the indication including resource information indicating a resource based on the first information, the indication indicating that no transmission is intended for the terminal in the resource, and
        identify that no transmission is intended for the terminal in the resource based on the resource information included in the indication and the granularity information included in the first information.

12. The terminal of claim 11, wherein the resource information indicates a physical resource block (PRB).

13. The terminal of claim 11, wherein the first information is transmitted in a radio resource control (RRC) message.

14. The terminal of claim 11, wherein, to identify that no transmission is intended for the terminal in the resource, the at least one processor is further configured to:
    receive, from the base station, first data on the resource,
    transmit, to the base station, a negative acknowledgement message for the first data,
    receive, from the base station, downlink control information (DCI) including second information indicating whether second data being received on the resource is combinable with the first data, receive, from the base station, the second data on the resource based in the DCI; and decode the second data based on the second information.

15. The terminal of claim 14, wherein the second information indicates whether the second data being received on the resource is combinable with the received first data per a code block group (CBG).

16. A base station, the base station comprising:

a transceiver; and at least one processor configured to:

transmit, to a terminal, first information for configuring the terminal to monitor an indication, the first information including granularity information associated with the indication, transmit, to the terminal, the indication including resource information indicating a resource based on the first information, the indication indicating that no transmission is intended for the terminal in the resource, and identify that no transmission is intended for the terminal in the resource based on the resource information included in the indication and the granularity information included in the first information.

17. The base station of claim 16, wherein the resource information indicates a physical resource block (PRB).

18. The base station of claim 16, wherein the first information is transmitted in a radio resource control (RRC) message.

19. The base station of claim 16, wherein, to identify that no transmission is intended for the terminal in the resource, the at least one processor is further configured to:

transmit, to the terminal, first data on the resource, receive, from the terminal, a negative acknowledgement message for the first data, transmit, to the terminal, downlink control information (DCI) including second information indicating whether second data being received on the resource is combinable with the first data, and transmit, to the terminal, the second data on the resource based in the DCI.

20. The base station of claim 19, wherein the second information indicates whether the second data being received on the resource is combinable with the received first data per a code block group (CBG).

* * * * *